US009358763B2

(12) United States Patent
Kurimura

(10) Patent No.: US 9,358,763 B2
(45) Date of Patent: Jun. 7, 2016

(54) METHOD OF MANUFACTURING TRANSLUCENT RIGID SUBSTRATE LAMINATE AND TRANSLUCENT RIGID SUBSTRATE BONDING APPARATUS

(75) Inventor: Hiroyuki Kurimura, Shibukawa (JP)

(73) Assignee: DENKA COMPANY LIMITED, Tokyo (JP)

( * ) Notice: Subject to any disclaimer, the term of this patent is extended or adjusted under 35 U.S.C. 154(b) by 140 days.

(21) Appl. No.: 14/233,025

(22) PCT Filed: Jul. 13, 2012

(86) PCT No.: PCT/JP2012/068020
§ 371 (c)(1),
(2), (4) Date: Jan. 15, 2014

(87) PCT Pub. No.: WO2013/011969
PCT Pub. Date: Jan. 24, 2013

(65) Prior Publication Data
US 2014/0150967 A1  Jun. 5, 2014

(30) Foreign Application Priority Data

Jul. 15, 2011 (JP) ................. 2011-156198

(51) Int. Cl.
*B32B 37/12* (2006.01)
*B32B 37/14* (2006.01)
(Continued)

(52) U.S. Cl.
CPC . *B32B 37/14* (2013.01); *B32B 7/06* (2013.01); *B32B 7/12* (2013.01);
(Continued)

(58) Field of Classification Search
CPC ........ B32B 37/12; B32B 37/00; B32B 37/14; B32B 7/12; C09J 5/00; C09D 133/14; C09D 133/066; C09D 133/06; C09D 133/00
See application file for complete search history.

(56) References Cited

U.S. PATENT DOCUMENTS 5,951,807 A     9/1999  Asano et al. ............... 156/273.5
8,673,105 B2 *  3/2014  Kurimura ............. G02F 1/1303
                                                    156/275.7

(Continued)

FOREIGN PATENT DOCUMENTS

| JP | 10-46110 A    | 2/1998  |
| JP | 11-071553 A   | 3/1999  |
| JP | 2000-44292 A  | 2/2000  |
| JP | 2000-169166 A | 6/2000  |
| JP | 2003-270606 A | 9/2003  |
| JP | 2006-1253 A   | 1/2006  |
| JP | 2009-205065 A | 9/2009  |
| JP | 2009-256125 A | 11/2009 |
| JP | 2010-169830 A | 5/2010  |

(Continued)

OTHER PUBLICATIONS

International Preliminary Report on Patentability mailed Jan. 21, 2014, issued in corresponding International Application No. PCT/JP2012/068020.

(Continued)

*Primary Examiner* — Daniel McNally
(74) *Attorney, Agent, or Firm* — Stein IP, LLC

(57) ABSTRACT

Provided is a method of manufacturing a translucent rigid substrate laminate, which method can improve position precision while increasing production efficiency. Further provided is a translucent rigid substrate bonding apparatus that contributes to improvement of the position precision while increasing production efficiency of a plate-shaped product. In the method of manufacturing a translucent rigid substrate laminate and the translucent rigid substrate bonding apparatus according to the present invention, when translucent rigid substrates are bonded in a predetermined positional relationship by interposing a photo-curable fixing agent including (A) polyfunctional (meth)acrylate, (B) monofunctional (meth)acrylate and (C) a photopolymerization initiator therebetween, only the fixing agent present in outer peripheral portions of both translucent rigid substrates is cured for provisional fastening.

11 Claims, 11 Drawing Sheets

(51) Int. Cl.
  *B32B 7/12* (2006.01)
  *C09D 4/00* (2006.01)
  *B32B 37/00* (2006.01)
  *C09J 5/00* (2006.01)
  *C09D 133/06* (2006.01)
  *C09D 133/14* (2006.01)
  *B32B 7/06* (2006.01)
  *B32B 17/10* (2006.01)
  *C08F 220/18* (2006.01)
  *C08F 222/10* (2006.01)
  *B32B 38/00* (2006.01)

(52) U.S. Cl.
  CPC ...... *B32B 17/10045* (2013.01); *B32B 17/1099* (2013.01); *B32B 17/10706* (2013.01); *B32B 37/00* (2013.01); *B32B 37/0076* (2013.01); *B32B 37/12* (2013.01); *C09D 4/00* (2013.01); *C09D 133/06* (2013.01); *C09D 133/066* (2013.01); *C09D 133/14* (2013.01); *C09J 5/00* (2013.01); *B32B 2038/0076* (2013.01); *B32B 2250/05* (2013.01); *B32B 2307/414* (2013.01); *B32B 2310/0837* (2013.01); *B32B 2315/08* (2013.01); *C08F 220/18* (2013.01); *C08F 222/1006* (2013.01); *C08L 2312/06* (2013.01); *C09J 2205/31* (2013.01); *C09J 2433/00* (2013.01); *Y10T 156/1111* (2015.01); *Y10T 156/1153* (2015.01)

(56) References Cited

U.S. PATENT DOCUMENTS

| | | | |
|---|---|---|---|
| 2002/0062787 A1* | 5/2002 | Hashizume | B32B 38/1841 118/664 |
| 2003/0205333 A1 | 11/2003 | Hayafuji et al. | 156/580 |
| 2008/0020164 A1 | 1/2008 | Kubota et al. | 428/40.1 |
| 2008/0188157 A1* | 8/2008 | Tashiro | G02F 1/1303 445/25 |
| 2009/0186552 A1* | 7/2009 | Shinya | G02F 1/133502 445/58 |
| 2009/0218034 A1 | 9/2009 | Kawabe | 156/99 |
| 2010/0000670 A1* | 1/2010 | Kurimura | C09J 4/00 156/247 |

FOREIGN PATENT DOCUMENTS

| | | |
|---|---|---|
| WO | WO 2008/018252 A1 | 2/2008 |
| WO | WO 2010/010900 A1 | 1/2010 |
| WO | WO 2011/089963 A1 | 7/2011 |
| WO | WO 2011/089964 A1 | 7/2011 |

OTHER PUBLICATIONS

International Search Report mailed Oct. 16, 2012, issued in corresponding International Application No. PCT/JP2012/068021.
U.S. Appl. No. 14/233,069, filed Jan. 15, 2014, Hiroyuki Kurimura, Denki Kagaku Kogyo Kabushiki Kaisha.
International Search Report mailed Oct. 2, 2012, issued in corresponding International Application No. PCT/JP2012/068020.

* cited by examiner

BEFORE BRUSH POLISHING
ADHESION STRENGTH REDUCED

AFTER BRUSH POLISHING

METHOD OF MANUFACTURING TRANSLUCENT RIGID SUBSTRATE LAMINATE AND TRANSLUCENT RIGID SUBSTRATE BONDING APPARATUS

CROSS-REFERENCE TO RELATED APPLICATIONS

This application is a national stage of International Application No. PCT/JP2012/068020, filed Jul. 13, 2012, which claims the benefit of Japanese Application No. 2011-156198, filed Jul. 15, 2011, in the Japanese Patent Office. All disclosures of the document(s) named above are incorporated herein by reference.

BACKGROUND OF THE INVENTION

1. Field of the Invention

The present invention relates to a method of manufacturing a translucent rigid substrate laminate and a translucent rigid substrate bonding apparatus, and particularly to a method of manufacturing a plate substrate laminate for manufacturing a protection substrate of a display element and a plate glass bonding apparatus used in a process of manufacturing the protection glass of the display element.

2. Description of the Related Art

Display elements such as liquid crystal displays (LCDs), organic EL displays (OELDs), electroluminescent displays (ELDs), field emission displays (FEDs), and plasma displays (PDPs) are used in display devices of various kinds of electronic equipment such as televisions, laptop computers, car navigations, electronic calculators, mobile phones, electronic organizers and personal digital assistants (PDAs). Further, a plate glass product for protection is generally installed to face the display element in order to protect the display element.

This plate glass product is obtained by processing the plate glass in size and shape suitable for each display device, but it is required that a large amount of plate glass products are processed at high production efficiency in order to cope with a price level required in the market.

Accordingly, Japanese Patent Application Laid-Open No. 2009-256125 (Patent Literature 1) proposes a method of increasing production efficiency of a plate glass product. Specifically, Patent Literature 1 proposes "a method of processing a plate glass, comprising: forming a material glass block (A) obtained by laminating a plurality of material plate glasses (1) and integrally fixing each material plate glass (1) by a strippable fixing material 2 interposed between the material plate glasses (1), forming division glass blocks (B) having a small area by dividing the material glass block (A) in a surface direction, forming product glass blocks (C) in a product form when viewed in a plan view by processing at least the outer peripheries of the division glass blocks (B), and individually separating the product glass blocks (C) after edge faces of the product glass blocks (C) are processed" (claim 1). Accordingly, there is described that "since division, external shape processing and edge face processing are performed while a plurality of material plate glasses are laminated, a plurality of plate glass products may be obtained by a few processes and productivity is high" (paragraph 0007).

Further, Patent literature 1 describes that "the fixing material (2) interposed between the material plate glasses (1) is a photo-curable liquid fixing material that is cured when ultraviolet rays are irradiated and softened when a temperature is increased (claim 4). Accordingly, there is described that "if a pressure is vertically applied with the photo-curable liquid fixing agent interposed between the upper and lower material plate glasses, the liquid fixing agent spreads to have a constant thickness in a film form over the entire surface between the upper and lower material plate glasses. If infrared rays are irradiated in this state, the liquid fixing agent spreading in the film form is cured to integrally fix the upper and lower plate glasses. Therefore, a plurality of material plate glasses may be quickly laminated with high precision so as to be integrally fixed. In addition, if the product glass block is immersed in warm water or the like to increase the temperature after final processing (edge face processing), the fixing agent cured between the plate glasses is softened and separated in a film form. Therefore, it is easy to recover and treat the fixing agent without causing environmental pollution (paragraph 0007).

The column of "Best Modes for Carrying Out the Invention" of Patent Literature 1 describes that twenty material plate glasses are laminated while a photo-curable liquid fixing agent is interposed between the material plate glasses, subsequently, the fixing agent is cured by irradiating ultraviolet rays (UV rays) to the upper surface of the laminated material plate glasses, and the material glass block in which the upper and lower material plate glasses are integrally fixed is formed (paragraphs 0010 to 0011).

PRIOR ART

Patent Literature

Patent Literature 1: Japanese Patent Application Laid-Open No. 2009-256125

SUMMARY OF THE INVENTION

Problems to be Solved by the Invention

According to a method of processing a plate glass described in Patent Literature 1, it is possible to manufacture a plate glass product having a given shape with high production efficiency. However, some of electronic equipment require that a desired printing pattern (for example, a design of a display screen of a mobile phone) is formed on a plate glass. In this case, high position precision with respect to the pattern to be printed is required (for example, an allowable error is about 10 to 30 μm).

In the method described in Patent Literature 1, twenty material plate glasses are laminated while the photo-curable liquid fixing agent is interposed between the material plate glasses and, subsequently, the fixing agent is cured by irradiating ultraviolet rays (UV rays) to the upper surface of the laminated material plate glass, and the material glass block in which the upper and lower material plate glasses are integrally fixed is formed. However, since the fixing agent is not cured while the material plate glass is laminated and slight misalignment easily occurs between the glass surfaces, such a procedure is not suitable for alignment with high precision. That is, it is difficult to obtain high position precision by the method described in Patent Literature 1.

Further, Patent Literature 1 discloses the invention of the method of bonding glasses, but does not describe an apparatus for implementing the same. It is preferable to provide an apparatus for bonding glasses for industrial mass-production.

Therefore, it is an object of the present invention to provide a method of manufacturing a translucent rigid substrate laminate capable of improving position precision. It is another object of the present invention to provide a method of manufacturing a plate-shaped product by using the method of manufacturing a translucent rigid substrate laminate. It is yet another object of the present invention to provide a translucent rigid substrate bonding apparatus contributing to improvement of position precision while increasing production efficiency of the plate-shaped product.

Means for Solving the Problem

The present inventors have intensively studied to solve the aforementioned problems and found that, when translucent rigid substrates are bonded in a predetermined positional relationship by interposing a photo-curable fixing agent therebetween, it is effective to cure only an outer peripheral portion of the fixing agent spreading between both translucent rigid substrates for provisional fastening (provisional irradiation).

The laminate of the provisionally fastened translucent rigid substrates is not easily subject to misalignment even though the substrates are laminated. Meanwhile, since the translucent rigid substrates are only bonded at the outer peripheral portions, a procedure for examining bonding position precision after provisional fastening and performing provisional fastening again after delamination is performed for rejected products is easily performed.

Further, a time required for provisional fastening is set so that irradiation energy per unit area is about ⅕ as compared to the case where the fixing agent spreading on the surface of the translucent rigid substrate is entirely cured. Accordingly, if the fixing agent present around the center of the surface of the substrate is cured (full fastening) after a plurality of translucent rigid substrates are laminated by provisional fastening, it is possible to manufacture a translucent rigid substrate laminate with high position precision and high production efficiency.

In one aspect of the present invention accomplished based on the above finding, there is provided a method of manufacturing a translucent rigid substrate laminate including:

1) a process of preparing a first translucent rigid substrate, 2) a process of preparing a second translucent rigid substrate, 3) a process of applying a photo-curable fixing agent including (A) polyfunctional (meth)acrylate, (B) monofunctional (meth)acrylate and (C) a photopolymerization initiator to a first surface of the first translucent rigid substrate and/or a first surface of the second translucent rigid substrate;

4) a process of allowing the first surface of the first translucent rigid substrate and the first surface of the second translucent rigid substrate to face each other so that the both surfaces are parallel to each other in a predetermined positional relationship in a surface direction;

5) a process of applying a given pressure to the first surface of the first translucent rigid substrate and the first surface of the second translucent rigid substrate while maintaining the positional relationship to bond the both translucent rigid substrates;

6) a process of irradiating light for curing only an outer peripheral portion of the fixing agent spreading between the both translucent rigid substrates to form a provisionally fastened translucent rigid substrate laminate;

7) a full fastening process of curing the uncured fixing agent present in the provisionally fastened translucent rigid substrate laminate to form a fully fastened translucent rigid substrate laminate; and 8) a process of repeating the processes 1) to 7) at least once by regarding the fully fastened translucent rigid substrate laminate as the first translucent rigid substrate to form a fully fastened translucent rigid substrate laminate in which at least three translucent rigid substrates are bonded.

In one embodiment of the method of manufacturing a translucent rigid substrate laminate according to the present invention, the full fastening process 7) is an irradiation process of irradiating light for curing the uncured fixing agent present in the provisionally fastened translucent rigid substrate laminate to form the fully fastened translucent rigid substrate laminate.

In another embodiment of the method of manufacturing a translucent rigid substrate laminate according to the present invention, the full fastening process 7) is a stand-still process of allowing the uncured fixing agent present in the provisionally fastened translucent rigid substrate laminate to stand for curing to form the fully fastened translucent rigid substrate laminate.

In yet another embodiment of the method of manufacturing a translucent rigid substrate laminate according to the present invention, the stand-still process in the full fastening process 7) is performed for 1 hour or more.

In yet another embodiment of the method of manufacturing a translucent rigid substrate laminate according to the present invention, the stand-still process in the full fastening process 7) is performed under a temperature environment of 10 to 35° C.

In yet another embodiment of the method of manufacturing a translucent rigid substrate laminate according to the present invention, the light is spot-irradiated to the outer peripheral portion of the fixing agent spreading between the both translucent rigid substrates only at two to six positions in the process 6) of forming the provisionally fastened translucent rigid substrate laminate.

In yet another embodiment of the method of manufacturing a translucent rigid substrate laminate according to the present invention, the process 6) of forming the provisionally fastened translucent rigid substrate laminate is a process of irradiating light for curing only the outer peripheral portion of the fixing agent spreading between the both translucent rigid substrates while maintaining the pressure to form the provisionally fastened translucent rigid substrate laminate.

In another aspect of the present invention, there is provided a method of manufacturing a translucent rigid substrate laminate including:

1) a process of preparing a first translucent rigid substrate;

2) a process of preparing a second translucent rigid substrate;

3) a process of applying a photo-curable fixing agent including (A) polyfunctional (meth)acrylate, (B) monofunctional (meth)acrylate and (C) a photopolymerization initiator to a first surface of the first translucent rigid substrate and/or a first surface of the second translucent rigid substrate;

4) a process of allowing the first surface of the first translucent rigid substrate and the first surface of the second translucent rigid substrate to face each other so that the both surfaces are parallel to each other in a predetermined positional relationship in a surface direction;

5) a process of applying a given pressure to the first surface of the first translucent rigid substrate and the first surface of the second translucent rigid substrate while maintaining the positional relationship to bond the both translucent rigid substrates;

6) a process of irradiating light for curing only an outer peripheral portion of the fixing agent spreading between the both translucent rigid substrates to form a provisionally fastened translucent rigid substrate laminate;

7') a process of repeating the processes 1) to 6) at least once by regarding the provisionally fastened translucent rigid substrate laminate as the first translucent rigid substrate to form a provisionally fastened translucent rigid substrate laminate in which at least three translucent rigid substrates are bonded; and 8') a full fastening process of curing the uncured fixing agent present in the provisionally fastened translucent rigid substrate laminate obtained in the process 7') to form a fully fastened translucent rigid substrate laminate.

In one embodiment of the method of manufacturing a translucent rigid substrate laminate according to the present invention, the full fastening process 8') is an irradiation process of irradiating light for curing the uncured fixing agent present in the provisionally fastened translucent rigid substrate laminate obtained in the process 7') to form the fully fastened translucent rigid substrate laminate.

In another embodiment of the method of manufacturing a translucent rigid substrate laminate according to the present invention, the full fastening process 8') is a stand-still process of allowing the uncured fixing agent present in the provisionally fastened translucent rigid substrate laminate obtained in the process 7') to stand for curing to form the fully fastened translucent rigid substrate laminate.

In yet another embodiment of the method of manufacturing a translucent rigid substrate laminate according to the present invention, the stand-still process in the full fastening process 8') is performed for 1 hour or more.

In yet another embodiment of the method of manufacturing a translucent rigid substrate laminate according to the present invention, the stand-still process in the full fastening process 8') is performed under a temperature environment of 10 to 35° C.

In yet another embodiment of the method of manufacturing a translucent rigid substrate laminate according to the present invention, the light is spot-irradiated to the outer peripheral portion of the fixing agent spreading between the both translucent rigid substrates only at two to six positions in the process 6) of forming the provisionally fastened translucent rigid substrate laminate.

In yet another embodiment of the method of manufacturing a translucent rigid substrate laminate according to the present invention, the process 6) of forming the provisionally fastened translucent rigid substrate laminate is a process of irradiating light for curing only the outer peripheral portion of the fixing agent spreading between the both translucent rigid substrates while maintaining the pressure to form the provisionally fastened translucent rigid substrate laminate.

In yet another embodiment of the method of manufacturing a translucent rigid substrate laminate according to the present invention, the method further includes:

8'') a process of repeating the processes 1) to 6) at least once by regarding the fully fastened translucent rigid substrate laminate obtained in the process 8') as the first translucent rigid substrate to form a complex translucent rigid substrate laminate; and 8''') a full fastening process of curing the uncured fixing agent present in the complex translucent rigid substrate laminate obtained in the process 8'') to form a fully fastened translucent rigid substrate laminate having an increased lamination number.

In yet another embodiment of the method of manufacturing a translucent rigid substrate laminate according to the present invention, the full fastening process 8''') is an irradiation process of irradiating light for curing the uncured fixing agent present in the complex translucent rigid substrate laminate obtained in the process 8'') to form the fully fastened translucent rigid substrate laminate having the increased lamination number.

In yet another embodiment of the method of manufacturing a translucent rigid substrate laminate according to the present invention, the full fastening process 8''') is a stand-still process of allowing the uncured fixing agent present in the complex translucent rigid substrate laminate obtained in the process 8'') to stand to form the fully fastened translucent rigid substrate laminate having the increased lamination number.

In yet another embodiment of the method of manufacturing a translucent rigid substrate laminate according to the present invention, the stand-still process in the full fastening process 8''') is performed for 1 hour or more.

In yet another embodiment of the method of manufacturing a translucent rigid substrate laminate according to the present invention, the stand-still process in the full fastening process 8''') is performed under a temperature environment of 10 to 35° C.

In yet another embodiment of the method of manufacturing a translucent rigid substrate laminate according to the present invention, the process 5) is performed by roll pressing.

In yet another embodiment of the method of manufacturing a translucent rigid substrate laminate according to the present invention, the outer peripheral portion is present in a margin region where a portion of a plate-shaped product is not formed.

In yet another embodiment of the method of manufacturing a translucent rigid substrate laminate according to the present invention, the full fastening process is performed while a given pressure is applied to the surfaces of the bonded translucent rigid substrates.

In yet another embodiment of the method of manufacturing a translucent rigid substrate laminate according to the present invention, the full fastening process is performed after bubbles mixed in with the uncured fixing agent are moved to a position where shape processing is not performed.

In yet another embodiment of the method of manufacturing a translucent rigid substrate laminate according to the present invention, a mark for position alignment is attached to the surface of each translucent rigid substrate, and the process 4) includes performing a position adjustment while imaging the marks by an imaging device.

In yet another embodiment of the method of manufacturing a translucent rigid substrate laminate according to the present invention, a given printing pattern and/or plating pattern for exhibiting one of functions of a translucent rigid substrate product is attached to the surface of each translucent rigid substrate.

In yet another embodiment of the method of manufacturing a translucent rigid substrate laminate according to the present invention, the fixing agent includes a granular material.

In yet another embodiment of the method of manufacturing a translucent rigid substrate laminate according to the present invention, a light irradiation amount in the process 6) is in the range of 1 mJ/cm$^2$ to 500 mJ/cm$^2$ when measured by a cumulative illuminometer using a light receptor of 365 nm.

In yet another embodiment of the method of manufacturing a translucent rigid substrate laminate according to the present invention, the translucent rigid substrate is a plate glass.

In yet another aspect of the present invention, there is provided a method of manufacturing a plate-shaped product including:

9) a process of dividing a translucent rigid substrate laminate obtained by using the above method of manufacturing a translucent rigid substrate laminate in a thickness direction to form a desired number of divided translucent rigid substrate laminates;

10) a process of performing desired shape processing on each of the divided translucent rigid substrate laminates; and 11) a process of heating the translucent rigid substrate laminate after the shape processing to delaminate the bonded translucent rigid substrates from each other and form a plurality of plate-shaped products.

In one embodiment of the method of manufacturing a plate-shaped product according to the present invention, a printing pattern is formed on the surface of the translucent rigid substrate and at least one of the division in the thickness direction in the process 9) and the shape processing in the process 10) is performed such that the printing pattern is cut.

In another embodiment of the method of manufacturing a plate-shaped product according to the present invention, the method further includes a process of bringing the divided translucent rigid substrate laminates into contact with a delaminating agent under temperature and time conditions required to reduce adhesion strength of an exposed portion of the outer edge of the fixing agent interposed between the translucent rigid substrates between the processes 9) and 10).

In yet another embodiment of the method of manufacturing a plate-shaped product according to the present invention, the delaminating agent includes one, two or more kinds selected from a solvent, an oxidizing agent and a surfactant.

In yet another embodiment of the method of manufacturing a plate-shaped product according to the present invention, the delaminating agent includes one, two or more kinds selected from water, alcohols, an oxidizing agent and a surfactant.

In yet another embodiment of the method of manufacturing a plate-shaped product according to the present invention, the delaminating agent includes the water, the alcohols and the surfactant in a mass ratio of 30 to 50:30 to 50:5 to 20.

In yet another embodiment of the method of manufacturing a plate-shaped product according to the present invention, the delaminating agent includes benzyl alcohol.

In yet another embodiment of the method of manufacturing a plate-shaped product according to the present invention, the delaminating agent includes an anionic surfactant.

In yet another embodiment of the method of manufacturing a plate-shaped product according to the present invention, the delaminating agent includes a sulfonic acid type surfactant.

In yet another embodiment of the method of manufacturing a plate-shaped product according to the present invention, a liquid temperature of the delaminating agent is 50° C. or lower and a contact time with the delaminating agent is 1 to 20 min.

In yet another embodiment of the method of manufacturing a translucent rigid substrate laminate according to the present invention, (A) the polyfunctional (meth)acrylate includes polyfunctional (meth)acrylate oligomer/polymer and/or bifunctional (meth)acrylate monomer.

In yet another embodiment of the method of manufacturing a translucent rigid substrate laminate according to the present invention, (B) the monofunctional (meth)acrylate includes one or more kinds selected from the group consisting of phenol 2 mol ethylene oxide-modified (meth)acrylate, 2-(1, 2-cyclohexacarboxylmide)ethyl (meth)acrylate and 2-hydroxy-3-phenoxypropyl (meth)acrylate.

In yet another embodiment of the method of manufacturing a translucent rigid substrate laminate according to the present invention, (B) the monofunctional (meth)acrylate includes phenol 2 mol ethylene oxide-modified (meth)acrylate and 2-(1,2-cyclohexacarboxylmide)ethyl (meth)acrylate.

In yet another embodiment of the method of manufacturing a translucent rigid substrate laminate according to the present invention, (B) the monofunctional (meth)acrylate includes phenol 2 mol ethylene oxide-modified (meth)acrylate and 2-hydroxy-3-phenoxypropyl (meth)acrylate.

In yet another embodiment of the method of manufacturing a translucent rigid substrate laminate according to the present invention, the fixing agent is a two-part composition, a first agent includes at least (F) an organic peroxide and a second agent includes at least (G) a decomposition promoter.

In yet another embodiment of the method of manufacturing a translucent rigid substrate laminate according to the present invention, a plurality of the processes are performed in parallel.

In yet another aspect of the present invention, there is provided a translucent rigid substrate bonding apparatus including:

an upper stage having a suction hole for vacuum suction of an upper translucent rigid substrate to hold the upper translucent rigid substrate;

a press unit for moving the upper stage in a Z-axis direction;

a suction unit for applying a suction force to the suction hole;

a lower stage for holding a lower translucent rigid substrate;

a means for moving the lower stage in an X-axis direction, a Y-axis direction and a θ-axis direction;

a means for applying a photo-curable fixing agent including (A) polyfunctional (meth)acrylate, (B) monofunctional (meth)acrylate and (C) a photopolymerization initiator to either one or both of a lower surface of the upper translucent rigid substrate and an upper surface of the lower translucent rigid substrate; and light irradiators arranged at such positions as to irradiate light toward outer peripheral portions of bonding surfaces of the both translucent rigid substrates.

In one embodiment of the translucent rigid substrate bonding apparatus according to the present invention, the light irradiators are arranged to spot-irradiate the outer peripheral portion only at two to six positions.

In another embodiment of the translucent rigid substrate bonding apparatus according to the present invention, the light irradiators are arranged on the lower surface of the upper stage along the outer periphery of the held translucent rigid substrate and irradiate the light in a downward direction.

In yet another embodiment of the translucent rigid substrate bonding apparatus according to the present invention, the light can be selectively irradiated to the fixing agent present in the outer peripheral portion of the translucent rigid substrate by arranging the light irradiators in such a manner. The light is irradiated to the upper translucent rigid substrate. This is particularly effective when upper translucent rigid substrates are laminated one by one on the lower translucent rigid substrate (may be one translucent rigid substrate or a translucent rigid substrate laminate of two or more translucent rigid substrates).

In yet another embodiment of the translucent rigid substrate bonding apparatus according to the present invention, the light irradiators are arranged on the upper surface of the lower stage along the outer periphery of the held translucent rigid substrate and irradiate the light in an upward direction.

By arranging the light irradiators in such a manner, the light can be similarly selectively irradiated to the fixing agent present in the outer peripheral portion of the translucent rigid substrate. The light is irradiated to the lower translucent rigid substrate. This is particularly effective when lower translucent rigid substrates are laminated one by one to the upper translucent rigid substrate (may be one translucent rigid substrate or a translucent rigid substrate laminate of two or more translucent rigid substrates). In this case, if the translucent rigid substrate laminate after bonding is held on the upper stage without being taken out, translucent rigid substrates can be successively laminated by supplying a next translucent rigid substrate to be laminated from the lower stage.

In yet another embodiment of the translucent rigid substrate bonding apparatus according to the present invention, the light irradiators are arranged to surround outer peripheral side surfaces of the both translucent rigid substrates to be bonded and irradiate the light toward the outer peripheral side surfaces.

Also in this case, the light can be similarly selectively irradiated to the fixing agent present in the outer peripheral portions of the translucent rigid substrates. Since energy of the light irradiated to the outer peripheral side surfaces are absorbed by the fixing agent, the light does not reach the vicinities of the centers of the translucent rigid substrates. Further, by making the light irradiators movable in the Z-axis direction, the light irradiators can follow the height of the bonding surfaces. Thus, application is possible both in the case of laminating the lower translucent rigid substrates one by one to the upper translucent rigid substrate and in the case of laminating the upper translucent rigid substrates one by one on the lower translucent rigid substrate. If the translucent rigid substrate laminate after bonding is held on the upper stage without being taken out, translucent rigid substrates can be successively laminated by supplying a next translucent rigid substrate to be laminated from the lower stage.

In yet another embodiment of the translucent rigid substrate bonding apparatus according to the present invention, the apparatus further includes an imaging unit for imaging alignment marks provided on the surfaces of the upper and lower translucent rigid substrates, an image processing unit for detecting a degree of misalignment of the alignment marks provided on the surfaces of the upper and lower translucent rigid substrates based on an imaging result, and a control unit for controlling the lower stage moving means based on the detected degree of misalignment.

By finely adjusting a positional relationship of the translucent rigid substrates using the imaging unit, the substrates can be laminated with higher position precision. Thus, a case where high position precision is required such as a case where printing patterns or plating patterns are attached to the surfaces of the translucent rigid substrates can also be dealt with.

In yet another embodiment of the translucent rigid substrate bonding apparatus according to the present invention, the outer peripheral portion to be irradiated with the light by the light irradiators is a margin region where a portion of a plate-shaped product is not formed.

In the case of selectively irradiating light to the margin region, a portion of the substrate that constitutes the plate-shaped product needs not be irradiated with light for provisional fastening. Thus, a light irradiation history of this portion can be made uniform when full fastening is performed later, wherefore there is an advantage of being able to suppress the distortion of the substrates followed with the distortion of the fixing agent.

In yet another embodiment of the translucent rigid substrate bonding apparatus according to the present invention, the translucent rigid substrate held on the upper stage and/or the lower stage is a laminate of two or more translucent rigid substrates.

By using the laminate of two or more translucent rigid substrates as the upper and/or lower translucent rigid substrate to be bonded in the present invention, a substrate laminate of three or more translucent rigid substrates can be manufactured.

In yet another embodiment of the translucent rigid substrate bonding apparatus according to the present invention, the means for applying the fixing agent applies the fixing agent including a granular material.

Since the fixing agent can have a constant thickness by including the granular material, processing precision is improved. Further, due to differences in linear expansion coefficient between the fixing agent components and the granular material, a delamination property when delamination is performed later is also improved.

In yet another embodiment of the translucent rigid substrate bonding apparatus according to the present invention, the translucent rigid substrate is a plate glass.

In yet another embodiment of the translucent rigid substrate bonding apparatus according to the present invention, (A) the polyfunctional (meth)acrylate includes polyfunctional (meth)acrylate oligomer/polymer and/or bifunctional (meth)acrylate monomer.

In yet another embodiment of the translucent rigid substrate bonding apparatus according to the present invention, (B) the monofunctional (meth)acrylate includes one or more kinds selected from the group consisting of phenol 2 mol ethylene oxide-modified (meth)acrylate, 2-(1,2-cyclohexacarboxylmide)ethyl (meth)acrylate and 2-hydroxy-3-phenoxypropyl (meth)acrylate.

In yet another embodiment of the translucent rigid substrate bonding apparatus according to the present invention, (B) the monofunctional (meth)acrylate includes phenol 2 mol ethylene oxide-modified (meth)acrylate and 2-(1,2-cyclohexacarboxylmide)ethyl (meth)acrylate.

In yet another embodiment of the translucent rigid substrate bonding apparatus according to the present invention, (B) the monofunctional (meth)acrylate includes phenol 2 mol ethylene oxide-modified (meth)acrylate and 2-hydroxy-3-phenoxypropyl (meth)acrylate.

In yet another embodiment of the translucent rigid substrate bonding apparatus according to the present invention, the fixing agent is a two-part composition, a first agent includes at least (F) an organic peroxide and a second agent includes at least (G) a decomposition promoter.

Effects of Invention

According to the present invention, it is possible to manufacture a translucent rigid substrate laminate with high position precision. Therefore, it is possible to industrially manufacture a plate-shaped product with high dimensional precision. The present invention may be preferably used, for example, in a method of mass-producing a protection glass of a display element.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
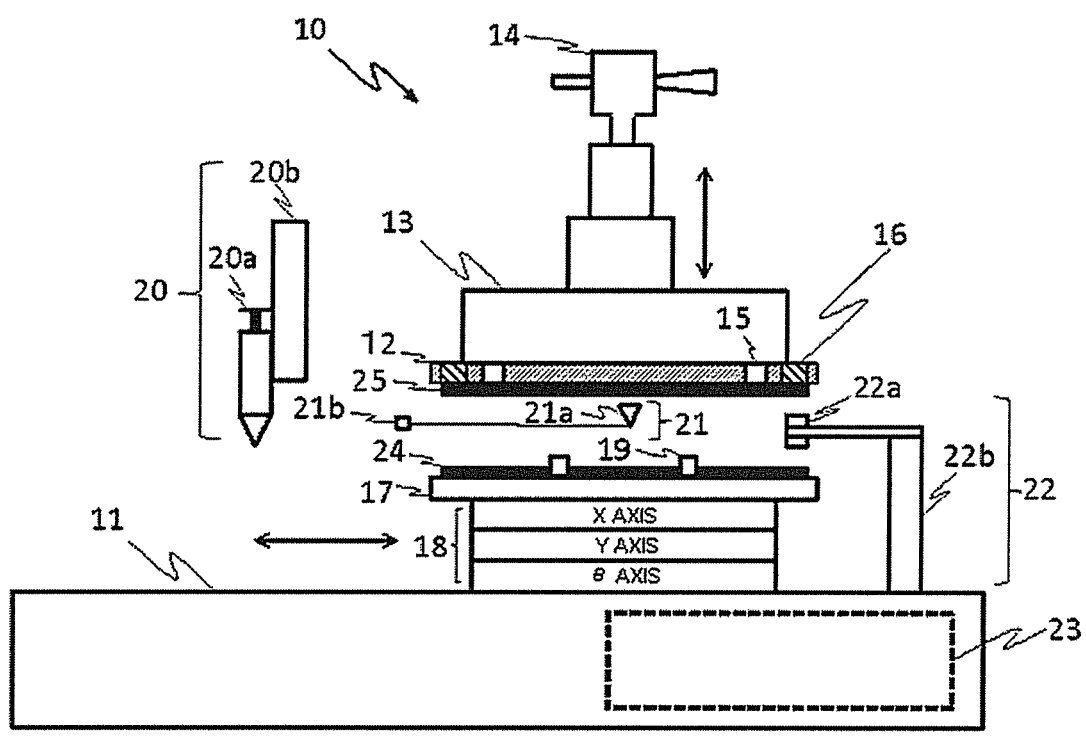
FIG. 1 is a schematic diagram illustrating a first example of a translucent rigid substrate bonding apparatus usable in the practice of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

First Embodiment

In a first embodiment of a method of manufacturing a translucent rigid substrate laminate according to the present invention, the following processes are performed:

1) a process of preparing a first translucent rigid substrate,
2) a process of preparing a second translucent rigid substrate,
3) a process of applying a photo-curable fixing agent including (A) polyfunctional (meth)acrylate, (B) monofunctional (meth)acrylate and (C) a photopolymerization initiator to a first surface of the first translucent rigid substrate and/or a first surface of the second translucent rigid substrate,
4) a process of allowing the first surface of the first translucent rigid substrate and the first surface of the second translucent rigid substrate to face each other so that the both surfaces are parallel to each other in a predetermined positional relationship in a surface direction,
5) a process of applying a given pressure to the first surface of the first translucent rigid substrate and the first surface of the second translucent rigid substrate while maintaining the positional relationship to bond the both translucent rigid substrates,
6) a process of irradiating light for curing only an outer peripheral portion of the fixing agent spreading between the both translucent rigid substrates to form a provisionally fastened translucent rigid substrate laminate,
7) a full fastening process of curing the uncured fixing agent present in the provisionally fastened translucent rigid substrate laminate to form a fully fastened translucent rigid substrate laminate, and
8) a process of repeating the processes 1) to 7) at least once by regarding the fully fastened translucent rigid substrate laminate as the first translucent rigid substrate to form a fully fastened translucent rigid substrate laminate in which at least three translucent rigid substrates are bonded.

In the processes (1) and (2), the translucent rigid substrate to be processed is prepared. The translucent rigid substrate is not particularly limited, but examples thereof may include a plate glass (such as a material plate glass, a transparent conductive film-attached glass substrate or a glass substrate formed with an electrode or a circuit), a sapphire substrate, a quartz substrate, a plastic substrate, a magnesium fluoride substrate and the like. Examples of glass may include reinforced glass. The size of the translucent rigid substrate is not particularly limited, but the translucent rigid substrate typically has an area of about 10,000 to 250,000 $mm^2$ and a thickness of about 0.1 to 2 mm. Generally, each translucent rigid substrate has the same size. A given printing pattern or plating pattern for exhibiting one of functions of a plate-shaped product may be attached to the surface of the translucent rigid substrate although it is not restrictive. Examples of the printing pattern may include a design of a display screen of a mobile phone, and examples of the plating pattern may include a rotary encoder on which a chrome plating pattern is formed.

In the process (3), the photo-curable fixing agent is applied to the first surface of the first translucent rigid substrate and/or the first surface of the second translucent rigid substrate. The photo-curable fixing agent is a fixing agent that is cured by being irradiated with light such as ultraviolet rays and softened by being heated at high temperatures, and various kinds of fixing agents are known. Any known photo-curable fixing agent may be used as the photo-curable fixing agent used in the present invention and there is no particular limitation. The photo-curable fixing agent may be applied to a bonding surface of either one of the translucent rigid substrates, but is preferably applied to the bonding surfaces of the both translucent rigid substrates in view of improvement of an adhesion property.

Examples of the photo-curable fixing agent preferably used in the present invention may include an adhesive composition including (A) polyfunctional (meth)acrylate, (B) monofunctional (meth)acrylate and (C) a photopolymerization initiator.

As (A) the polyfunctional (meth)acrylate, polyfunctional (meth)acrylate oligomer/polymers having two or more (meth)acryloyl groups at an end or side chain of the oligomer/polymer, and polyfunctional (meth)acrylate monomers having two or more (meth)acryloyl groups may be used. Examples of the polyfunctional (meth)acrylate oligomer/polymer may include 1,2-polybutadiene terminated urethane (meth)acrylate (for example, "TE-2000" and "TEA-1000"

manufactured by Nippon Soda Co., Ltd.), a hydrogenated product thereof (for example, "TEAI-1000" manufactured by Nippon Soda Co., Ltd.), 1,4-polybutadiene terminated urethane (meth)acrylate (for example, "BAC-45" manufactured by Osaka Organic Chemical Industry Ltd.), polyisoprene terminated (meth)acrylate, polyester-based urethane (meth)acrylate (for example, "UV-2000B", "UV-3000B" and "UV-7000B" manufactured by The Nippon Synthetic Chemical Industry Co., Ltd., and "KHP-11" and "KHP-17" manufactured by Negami Chemical Industrial, Co., Ltd.), polyether-based urethane (meth)acrylate (for example, "UV-3700B" and "UV-6100B" manufactured by The Nippon Synthetic Chemical Industry Co., Ltd.), bisphenol A type epoxy (meth)acrylate or the like.

Among these, polyester-based urethane (meth)acrylate and/or polyether-based urethane (meth)acrylate are preferable and polyester-based urethane (meth)acrylate is more preferable in view of a large effect.

A weight-average molecular weight of polyfunctional (meth)acrylate oligomer/polymer is preferably 7,000 to 60,000, more preferably 13,000 to 40,000. The weight-average molecular weight was obtained using a GPC system (SC-8010 manufactured by Tosoh Corporation) or the like and preparing a calibration curve using commercially available standard polystyrene.

Examples of bifunctional (meth)acrylate monomer may include 1,3-butylene glycol di(meth)acrylate, 1,4-butanediol di(meth)acrylate, 1,6-hexanediol di(meth)acrylate, 1,9-nonanediol di(meth)acrylate, neopentylglycol di(meth)acrylate, dicyclopentanyl di(meth)acrylate, 2-ethyl-2-butyl-propandiol di(meth)acrylate, neopentyl glycol-modified trimethylolpropane di(meth)acrylate, stearic acid-modified pentaerythritol di(meth)acrylate, polypropylene glycol di(meth)acrylate, 2,2-bis(4-(meth)acryloxydiethoxyphenyl)propane, 2,2-bis(4-(meth)acryloxypropoxyphenyl)propane, 2,2-bis(4-(meth)acryloxytetraethoxyphenyl)propane or the like. Among these, 1,6-hexanediol di(meth)acrylate and/or dicyclopentanyl di(meth)acrylate are preferable and dicyclopentanyl di(meth)acrylate is more preferable in view of a large effect.

Examples of trifunctional (meth)acrylate monomer may include trimethylolpropane tri(meth)acrylate, tris[(meth)acryloxyethyl] isocyanurate and the like. Examples of tetra- or more-functional (meth)acrylate monomer may include dimethylolpropane tetra(meth)acrylate, pentaerythritol tetra(meth)acrylate, pentaerythritolethoxy tetra(meth)acrylate, dipentaerythritol penta(meth)acrylate, dipentaerythritol hexa(meth)acrylate or the like.

Among polyfunctional (meth)acrylates, it is preferable to include polyfunctional (meth)acrylate oligomer/polymer and/or bifunctional (meth)acrylate monomer in view of a large effect. It is more preferable to use polyfunctional (meth)acrylate oligomer/polymer and bifunctional (meth)acrylate monomer in combination.

A content ratio of polyfunctional (meth)acrylate oligomer/polymer to bifunctional (meth)acrylate monomer in the case of using polyfunctional (meth)acrylate oligomer/polymer and bifunctional (meth)acrylate monomer in combination is preferably 10 to 90:90 to 10, more preferably 25 to 75:75 to 25 and most preferably 40 to 65:60 to 35 in a mass ratio based on 100 parts by mass of the total content of polyfunctional (meth)acrylate oligomer/polymer and bifunctional (meth)acrylate monomer.

Examples of the monofunctional (meth)acrylate monomer (B) may include methyl (meth)acrylate, ethyl (meth)acrylate, propyl (meth)acrylate, butyl (meth)acrylate, 2-ethyl hexyl (meth)acrylate, isooctyl (meth)acrylate, isodecyl (meth)acrylate, lauryl (meth)acrylate, stearyl (meth)acrylate, phenyl (meth)acrylate, cyclohexyl (meth)acrylate, dicyclopentanyl (meth)acrylate, dicyclopentenyl (meth)acrylate, dicyclopentenyloxyethyl (meth)acrylate, isobornyl (meth)acrylate, methoxylated cyclodecatriene (meth)acrylate, 2-hydroxyethyl (meth)acrylate, 2-hydroxypropyl (meth)acrylate, 3-hydroxypropyl (meth)acrylate, 4-hydroxybutyl (meth)acrylate, tetrahydrofurfuryl (meth)acrylate, 2-hydroxy-3-phenoxypropyl (meth)acrylate, glycidyl (meth)acrylate, caprolacton-modified tetrahydrofurfuryl (meth)acrylate, 3-chloro-2-hydroxypropyl (meth)acrylate, N,N-dimethylaminoethyl (meth)acrylate, N,N-diethylaminoethyl (meth)acrylate, t-butylaminoethyl (meth)acrylate, ethoxycarbonylmethyl (meth)acrylate, phenolethylene oxide-modified (meth)acrylate, phenol (2 mol ethylene oxide-modified) (meth)acrylate, phenol (4 mol ethylene oxide-modified) (meth)acrylate, paracumylphenolethylene oxide-modified (meth)acrylate, nonylphenolethylene oxide-modified (meth)acrylate, nonylphenol (4 mol ethylene oxide-modified) (meth)acrylate, nonylphenol (8 mol ethylene oxide-modified) (meth)acrylate, nonylphenol (2.5 mol propylene oxide-modified) (meth)acrylate, 2-ethylhexylcarbitol (meth)acrylate, ethylene oxide-modified phthalic acid (meth)acrylate, ethylene oxide-modified succinic acid (meth)acrylate, trifluoroethyl (meth)acrylate, acrylic acid, methacrylic acid, maleic acid, fumaric acid, w-carboxy-polycaprolacton mono(meth)acrylate, phthalic acid monohydroxyethyl (meth)acrylate, (meth)acrylic acid dimer, β-(meth)acryloyloxyethyl hydrogen succinate, n-(meth)acryloyl oxyalkylhexahydrophthalimide, 2-(1,2-cyclohexacarboxylmide)ethyl (meth)acrylate, ethoxydiethyleneglycol (meth)acrylate, benzyl (meth)acrylate and the like.

Among monofunctional (meth)acrylates, one or more kinds selected from the group consisting of phenol 2 mol ethylene oxide-modified (meth)acrylate, 2-(1,2-cyclohexacarboxylmide)ethyl (meth)acrylate and 2-hydroxy-3-phenoxypropyl (meth)acrylate are preferable in view of a large effect. It is more preferable to use phenol 2 mol ethylene oxide-modified (meth)acrylate and 2-(1,2-cyclohexacarboxylmide)ethyl (meth)acrylate and/or 2-hydroxy-3-phenoxypropyl (meth)acrylate in combination.

A content ratio of phenol 2 mol ethylene oxide-modified (meth)acrylate to 2-(1,2-cyclohexacarboxylmide)ethyl (meth)acrylate and/or 2-hydroxy-3-phenoxypropyl (meth)acrylate in the case of using phenol 2 mol ethylene oxide-modified (meth)acrylate and 2-(1,2-cyclohexacarboxylmide)ethyl (meth)acrylate and/or 2-hydroxy-3-phenoxypropyl (meth)acrylate in combination is preferably 5 to 80:95 to 20, more preferably 15 to 60:85 to 40 and most preferably 20 to 40:70 to 60 in a mass ratio based on 100 parts by mass of the total content of phenol 2 mol ethylene oxide-modified (meth)acrylate and 2-(1,2-cyclohexacarboxylmide)ethyl (meth)acrylate and/or 2-hydroxy-3-phenoxypropyl (meth)acrylate.

A mixing ratio of (A) the polyfunctional (meth)acrylate and (B) the monofunctional (meth)acrylate is preferably (A):(B)=5:95 to 95:5 (parts by mass). If the ratio is 5 parts by mass or more, there is no possibility of a reduction in initial adhesion property. If the ratio is 95 parts by mass or less, a delamination property may be ensured. The cured fixing agent is delaminated in a film form by being immersed in warm water. The content of (B) the monofunctional (meth)acrylate is more preferably 40 to 80 parts by mass based on 100 parts by mass of the total content of (A) and (B).

The photopolymerization initiator (C) is mixed to promote photocuring of a resin composition by being sensitized by active rays such as visible rays and ultraviolet rays, and various kinds of known photopolymerization initiators may be used. Specifically, examples of the photopolymerization initiator may include benzophenone or a derivative thereof; benzyl or a derivative thereof; anthraquinone or a derivative thereof; benzoin; a benzoin derivative such as benzoinmethylether, benzomethylether, benzoinpropylether, benzoinisobutylether and benzyldimethylketal; an acetophenon derivative such as diethoxy acetophenon and 4-t-butyltrichloroacetophenon; 2-dimethylaminoethylbenzoate; p-dimethylaminoethylbenzoate; diphenyl disulfide; thioxanthone or a derivative thereof; camphorquinone; a camphorquinone derivative such as 7,7-dimethyl-2,3-dioxobicyclo[2.2.1]heptane-1-carboxylic acid, 7,7-dimethyl-2,3-dioxobicyclo[2.2.1]heptane-1-carboxy-2-bromoethylester, 7,7-dimethyl-2,3-dioxobicyclo[2.2.1]heptane-1-carboxy-2-methylester and 7,7-dimethyl-2,3-dioxobicyclo[2.2.1]heptane-1-carboxylic acid chloride; an α-aminoalkylphenon derivative such as 2-methyl-1-[4-(methylthio)phenyl]-2-morpholinopropan-1-on and 2-benzyl-2-dimethyl amino-1-(4-morpholinophenyl)-butanone-1; an acylphosphine oxide derivative such as benzoyldiphenylphosphine oxide, 2,4,6-trimethylbenzoyldiphenylphosphine oxide, benzoyldiethoxyphosphine oxide, 2,4,6-trimethyl benzoyl dimethoxyphenylphosphine oxide and 2,4,6-trimethyl benzoyl diethoxyphenylphosphine oxide; oxy-phenyl-acetic acid 2-[2-oxo-2-phenyl-acetoxy-ethoxy]-ethyl ester and/or oxy-phenyl-acetic acid 2-[2-hydroxy-ethoxy]-ethyl ester. The photopolymerization initiator may be used alone or in combination of two or more kinds thereof. Among these, in view of a large effect, it is preferable to use one, two or more kinds selected from the group consisting of 1 benzyldimethylketal, oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester.

The content of the photopolymerization initiator (C) is preferably 0.1 to 30 parts by mass, more preferably 0.1 to 25 parts by mass and most preferably 0.5 to 10 parts by mass based on 100 parts by mass of the total content of (A) and (B). If the content is 0.1 parts by mass or more, a curing promotion effect may be reliably obtained. If the content is 20 parts by mass or less, a sufficient curing speed may be obtained. Addition of 1 part by mass or more of the component (C) is more preferable in that curing can be performed without depending on the amount of irradiation of light, a degree of crosslinking of a cured body of the composition is increased, misalignment and the like during cutting processing is prevented and a delamination property is improved.

The photo-curable fixing agent preferably includes the granular material (D) that is not dissolved in the components (A), (B) and (C) of the fixing agent. Since this enables the composition after curing to maintain a constant thickness, processing precision is improved. Further, since linear expansion coefficients of the cured body of the adhesive composition and the granular material (D) differ, a delamination property is improved when delamination is performed after the translucent rigid substrates are bonded using the adhesive composition.

Any one of generally used organic particles or inorganic particles may be used as the material of the granular material (D). Specifically, examples of the organic particles may include polyethylene particles, polypropylene particles, crosslinked polymethylmethacrylate particles, crosslinked polystyrene particles and the like. Examples of the inorganic particles may include ceramic particles such as glass, silica, alumina and titanium.

The granular material (D) preferably has a spherical shape in view of improvement of processing precision, i.e., control of the film thickness of the adhesive. An average particle size of the granular material (D) by a laser method is preferably in the range of 20 to 200 μm. If the average particle size of the granular material is less than 20 μm, a delamination property is poor. If the average particle size is 200 μm or more, misalignment easily occurs when a provisionally fixed member is processed and dimensional precision is poor. In view of the delamination property and the dimensional precision, the average particle size (D50) is preferably 35 to 150 μm and more preferably 50 to 120 μm. A particle size distribution is measured by a laser diffraction type particle size distribution measurement device.

In view of the adhesion property, processing precision and delamination property, the use amount of the granular material (D) is preferably 0.01 to 20 parts by mass, more preferably 0.05 to 10 parts by mass, most preferably 0.1 to 6 parts by mass and further preferably 0.2 to 2 parts by mass based on 100 parts by mass of the total amount of (A) and (B).

A polymerization inhibitor (E) may be added to the photo-curable fixing agent in order to improve storage stability. Examples of the polymerization inhibitor may include methylhydroquinone, hydroquinone, 2,2-methylene-bis(4-methyl-6-tertiarybutylphenol), catechol, hydroquinonemonomethylether, monotertiarybutylhydroquinone, 2,5-ditertiarybutylhydroquinone, p-benzoquinone, 2,5-diphenyl-p-benzoquinone, 2,5-ditertiarybutyl-p-benzoquinone, picric acid, citric acid, phenothiazine, tertiarybutylcatechol, 2-butyl-4-hydroxyanisole, 2,6-ditertiarybutyl-p-cresol and the like.

The use amount of the polymerization inhibitor (E) is preferably 0.001 to 3 parts by mass and more preferably 0.01 to 2 parts by mass based on 100 parts by mass of the total amount of (A) and (B). If the use amount is 0.001 parts by mass or more, storage stability is ensured. If the use amount is 3 parts by mass or less, a favorable adhesion property is obtained and the fixing agent is not left uncured.

The photo-curable fixing agent may include (F) an organic peroxide and (G) a decomposition promoter. This enables a curing property to be reliably obtained even if a printing pattern that does not transmit light is applied to the translucent rigid substrate in terms of design.

Figure 19:
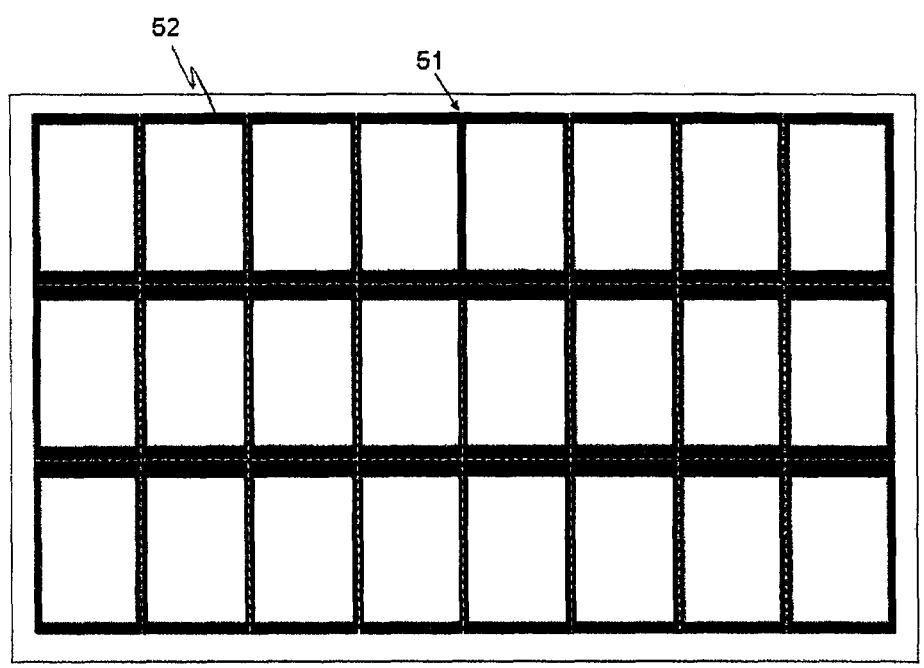
FIG. 19 is a view showing an example of a printing pattern attached to a surface of a translucent rigid substrate.

If a printing pattern, particularly a black printing pattern is applied, light hardly reaches the fixing agent present on the underside even if light is irradiated to the surface of the translucent rigid substrate. Thus, the photo-curable fixing agent present on the underside of the printing pattern is hardly cured. FIG. 19 illustrates an example of the printing pattern. In such a case, if the printing pattern is cut after processes (9) and (10) to be described later are performed on the translucent rigid substrate laminate, it causes problems that high dimensional precision is not obtained and chipping easily occurs. Further, since an uncured adhesive composition remains, a long washing process using a cleaning agent such as an alkali solution is necessary. However, if the fixing agent including the organic peroxide (F) and the decomposition promoter (G) is used, curing proceeds only by allowing the translucent rigid substrate laminate to stand even if light is not irradiated. Thus, the fixing agent present on the underside of the printing pattern can be cured.

Thus, if the full fastening process is a stand-still process, curing is possible without irradiating light by including the organic peroxide (F) and the decomposition promoter (G). This eliminates the problem that the uncured fixing agent remains on the underside of the printing pattern to deteriorate processability. It should be noted that if the full fastening process is performed in the form of a stand-still process, it requires 1 hour or more, preferably 4 hours or more until the fixing agent is sufficiently cured. By performing this process overnight, the next process can be performed in the following morning. Thus, a long curing time is not a substantive disadvantage. Further, the stand-still process may be performed under a temperature environment of 10 to 35° C., preferably 15 to 30° C. and heating is not necessary. A curing speed increases when heated, but there is a possibility that the fixing agent, which is once cured, is softened according to a heating time. Therefore, time management becomes difficult on the contrary.

By adopting the use of the photo-curable fixing agent including the organic peroxide (F) and the decomposition promote (G) and a combination of the process 6) of allowing only the outer peripheral portion of the fixing agent to be cured by light irradiation and the process 7) of allowing the entire fixing agent to stand for curing, high position precision is obtained while preventing chipping even if a printing pattern is attached to the translucent rigid substrate.

Examples of the organic peroxide (F) may include diacyl peroxides such as lauloyl peroxide and benzoyl peroxide; alkyl peroxy esters such as t-butylperoxy-3,5,5-trimethyl hexanoate, cumyl peroxy neodecanoate, hexyl peroxy pivalate, t-butyl peroxy isobutylate, t-butyl peroxy pivalate, t-butyl peroxy acetate, t-butyl peroxy benzoate and tertiary butyl peroxy-2-ethylhexanate; peroxydicarbonates such as diisopropyl peroxydicarbonate, di-2-ethylhexyl peroxydicarbonate, dinormal propyl peroxydicarbonate, bis(4-tertiary butyl cyclohexyl) peroxydicarbonate, di-2-ethoxyethyl peroxydicarbonate, dimethoxyisopropyl peroxydicarbonate, di(3-methyl-3-methoxybutyl) peroxydicarbonate and diallyl peroxydicarbonate; peroxycarbonates such as t-butyl peroxyisopropylcarbonate; peroxyketals such as di-t-butyl peroxy cyclohexane and di-(t-butyl peroxy) butane; dialkyl peroxides such as dicumyl peroxide, t-butyl cumyl peroxide and di-t-butyl peroxide; hydroperoxides such as cumene hydroperoxide and tetramethyl butyl hydroperoxide; and ketone peroxides such as ketone peroxide and cyclohexanone peroxide. Among these, alkyl peroxy esters and/or hydroperoxides are preferable, hydroperoxides are more preferable, and cumene hydroperoxide is most preferable.

The use amount of the organic peroxide (F) is preferably 0.05 to 5 parts by mass and more preferably 1 to 3 parts by mass based on 100 parts by mass of the total amount of (A) and (B). If the use amount is 1 part by mass or more, a curing property is reliably obtained. If the use amount is 3 parts by mass or less, sufficient storage stability is obtained and skin irritancy is reduced.

A decomposition promoter for promoting the decomposition of the organic peroxide is preferably used as the decomposition promoter (G). The followings are examples of the decomposition promoter (G) for promoting the decomposition of the organic peroxide.

In the case of using hydroperoxide or ketone peroxide as the organic peroxide, organic metal salt, organic metal chelate or the like is used as the decomposition promoter. Examples of the organic metal salt and the organic metal chelate may include cobalt naphthenate, copper naphthenate, manganese naphthenate, cobalt octenate, copper octenate, manganese octenate, cobalt octylate, copper acetylacetonate, titanium acetylacetonate, manganese acetylacetonate, chromium acetylacetonate, iron acetylacetonate, vanadyl acetylacetonate and cobalt acetylacetonate. Among these, cobalt octylate and/or vanadyl acetylacetonate are preferable and cobalt octylate is most preferable. Other examples of the decomposition promoter may include thiourea derivatives, mercaptobenzimidazole and amines. One, two or more kinds of these decomposition promoters (G) may be used.

The use amount of the decomposition promoter (G) is preferably 0.05 to 5 parts by mass and more preferably 0.3 to 3 parts by mass based on 100 parts by mass of the total amount of (A) and (B). If the use amount is 0.3 parts by mass or more, a curing property is reliably obtained. If the use amount is 3 parts by mass or less, sufficient storage stability is obtained.

The fixing agent including the organic peroxide (F) and the decomposition promoter (G) is typically provided as a two-part composition. A first agent and a second agent of the two-package fixing agent are preferably separately stored without mixing all essential components of the fixing agent during storage. In this case, the both agents may be used as the two-package fixing agent by being simultaneously or separately applied to a member, brought into contact and cured. In the case of use as the two-package fixing agent, it is preferable that the first agent at least includes the organic peroxide (F) and the second agent at least includes the decomposition promoter (G). The photopolymerization initiator (C) may include either one or both of the first and second agents. The present invention is also capable of curing a composition only by mixing the two agents.

The photo-curable fixing agent may include organic thermally expandable particles. This enables an effect of improving the delamination property to be reliably obtained.

In the process (4), the first surface of the first translucent rigid substrate and the first surface of the second translucent rigid substrate are allowed to face each other so that the both surfaces are parallel to each other in the predetermined positional relationship in the surface direction. Generally, the both translucent rigid substrates face each other in the surface direction so as to precisely overlap each other. A guide rail or frame for moving the translucent rigid substrate to a certain position by restricting a movement direction of the translucent rigid substrate may be considered as means for implementing this. In the case where positioning with higher precision is required, it is preferable to perform the positioning by a bonding apparatus having a positioning mechanism. For high-precision positioning, it is more preferable to attach a mark for alignment to the surface of each translucent rigid substrate and use a bonding apparatus that can perform a position adjustment while imaging the marks by an imaging device. If misalignment is corrected after the both translucent rigid substrates are bonded, the fixing agent may leak from bonding surfaces or the surfaces of the substrates may be scratched. Thus, it is preferable to correct misalignment before bonding.

Figure 18:
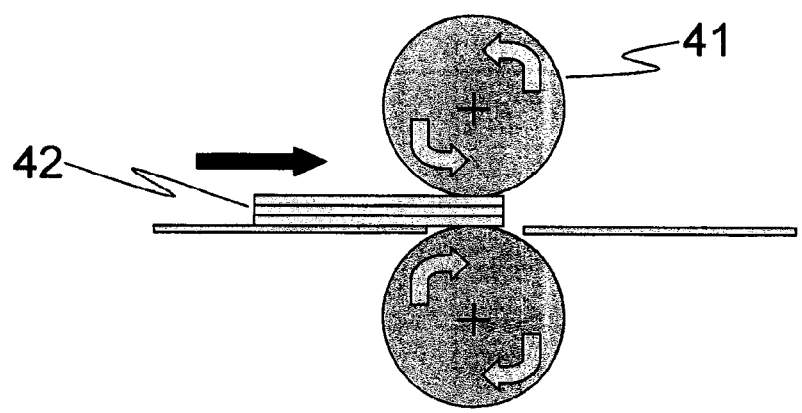
FIG. 18 is a schematic diagram illustrating a roll pressing principle.

In the process (5), the given pressure is applied to the first surface of the first translucent rigid substrate and the first surface of the second translucent rigid substrate to bond the translucent rigid substrates such that the fixing agent spreads on the bonding surfaces while maintaining the positional relationship determined in the process (4). In views of lamination precision, the fixing agent preferably spreads over the entire bonding surfaces to have a constant thickness. Although the process (5) may be performed using a translucent rigid substrate bonding apparatus to be described later, it may also be done by roll pressing. FIG. 18 illustrates a roll pressing principle.

If the amount of the applied fixing agent is excessively small, the fixing agent does not spread over the entire bonding surfaces, thus causing generation of bubbles on the bonding surfaces. If the bubbles are generated, position precision is reduced. If the amount of the applied fixing agent is excessively large, the fixing agent leaks from a gap between the bonding surfaces. Even if the fixing agent slightly leaks, the fixing agent may be wiped off and leakage is not a big problem. However, if the leakage amount is large, the fixing agent is wasted.

A pressure during bonding is related to the spread of the fixing agent. Accordingly, it is preferable to appropriately adjust the bonding pressure in addition to the amount of the fixing agent. A method of using a bonding apparatus having a function of controlling a pressure when the translucent rigid substrates are bonded to each other may be considered as a means for implementing the adjustment. A pressure during bonding may be appropriately set in consideration of the aforementioned matters and may be, for example, 5 to 50 $g/cm^2$ and typically 10 to 30 $g/cm^2$.

Further, it may be considered to control the thickness of the fixing agent. In addition to the method of mixing the granular material with the fixing agent as described above, a method of using a bonding apparatus having a function of controlling heights of the translucent rigid substrates when the translucent rigid substrates are bonded to each other may be considered as the method of controlling the thickness.

In the process (6), the provisionally fastened translucent rigid substrate laminate is formed by irradiating light for curing only the outer peripheral portion of the fixing agent spreading between the both translucent rigid substrates. The process (6) may be performed while the substrates are pressurized (e.g. while the pressure in the process (5) is maintained) or while no pressure is applied to the translucent rigid substrates.

By irradiating the light toward the entire outer peripheral portion of the fixing agent, only the outer peripheral portion of the fixing agent is annularly cured, the both translucent rigid substrates can be bonded with a relatively weak force and a function of preventing misalignment in laminating the translucent rigid substrates can be fulfilled.

In light of the purpose of preventing the bonded translucent rigid substrates from being easily misaligned, the outer peripheral portion is supposed to be an area with a certain width. However, if light is irradiated to an excessively inner part, the purpose of provisional fastening to such a degree as not to cause misalignment is destroyed and production efficiency is reduced due to a long irradiation time. Typically, the outer peripheral portion to be irradiated by LED units 16 has a width of about 5 to 25 mm, more typically 7 to 17 mm. Further, the outer peripheral portion to be irradiated with light is preferably present in a margin area where a portion of the plat-shaped product is not formed. A light irradiation history of a part where the plate-shaped product is formed when full irradiation is performed later can be made uniform to suppress the distortion of the fixing agent. As a result, the distortion of the substrates in this part can also be suppressed.

The internal fixing agent is not cured and has fluidity, but since the fixing agent of the outer peripheral portion is cured, the fixing agent does not leak from the gap between the both translucent rigid substrates. A wavelength of irradiated light may be appropriately changed according to a property of the fixing agent used. For example, microwaves, infrared rays, visible rays, ultraviolet rays, X-rays, γ-rays, electron beams and the like may be irradiated. Generally, irradiation light is ultraviolet rays because ultraviolet rays can be simply used and have relatively high energy. As described above, in the present invention, light means not only visible rays, but also electromagnetic waves (energy rays) including a wide wavelength region.

Light may be irradiated in an amount required to provisionally fasten the translucent rigid substrates. When the amount is measured by a cumulative illuminometer using a light receptor of 365 nm, the amount may be generally 1 to 500 $mJ/cm^2$, typically 50 to 450 $mJ/cm^2$ and more typically 200 to 400 $mJ/cm^2$. An irradiation time is generally 1 to 120 sec, typically 2 to 60 sec, and preferably 15 to 45 sec. It is possible to suppress curing distortion, control the thickness of the fixing agent and increase the lamination precision of the translucent rigid substrates by irradiating light with the bonding pressure maintained.

As described above, in the process (6), sufficiently high position precision is obtained even if light is spot-irradiated to the outer peripheral portion of the fixing agent spreading between the both translucent rigid substrates only at 2 to 6 positions instead of being irradiated over the entire outer peripheral portion. The number of positions of spot irradiation is supposed to be small in view of shortening a tact time while being large in view of position precision. However, in consideration of a balance between the both, spot irradiation is performed preferably at two or more positions and more preferably at four positions, assuming that it is performed on each corner portion of the translucent rigid substrate. When an irradiation amount is measured by the cumulative illuminometer using the light receptor of 365 nm, the amount may be generally 1 to 5,000 $mJ/cm^2$, typically 10 to 2,000 $mJ/cm^2$ and more typically 50 to 1,000 $mJ/cm^2$.

In the full fastening process (7), the uncured fixing agent present in the provisionally fastened translucent rigid substrate laminate is cured. The full fastening process (7) may be an irradiation process of irradiating light for curing the uncured fixing agent present in the provisionally fastened translucent rigid substrate laminate to form the fully fastened translucent rigid substrate laminate. Since lamination precision can be examined when the provisionally fastened translucent rigid substrate laminate is manufactured before the fully fastened translucent rigid substrate laminate is formed, there is an advantage of facilitating a repair when a defect occurs. To cure the uncured fixing agent present in the provisionally fastened translucent rigid substrate laminate, light may be irradiated to the entire bonding surfaces of the provisionally fastened translucent rigid substrates. Since the fixing agent in the outer peripheral portion is already cured, light needs not necessarily be irradiated to the outer peripheral portion. Rather, to make the cured state of the fixing agent uniform, an irradiation history of the entire fixing agent present between the bonding surfaces is preferably made uniform.

To this end, there is a method for selectively irradiating light to an inner region to which light is not irradiated when provisional fastening is performed. It is also considered to mask the outer peripheral portions of the translucent rigid substrates with a material that does not transmit ultraviolet rays when light is irradiated. Further, to increase bonding position precision, bonding is preferably performed while a given pressure is applied to the bonded translucent rigid substrate surfaces. By applying the pressure, it becomes possible to prevent problems such as the deflection of the substrates in the Z-axis direction due to cure shrinkage of the fixing agent to cause pattern misalignment and incapability to vacuum-suck. The applied pressure may be appropriately set in consideration of strength of the translucent rigid substrates and may be, for example, 5 to 50 $g/cm^2$ and typically 10 to 30 $g/cm^2$.

The irradiation amount of light irradiated in the full fastening process (7) is generally 30 to 4,000 $mJ/cm^2$, typically 100 to 3,000 $mJ/cm^2$, more typically 300 to 2,500 $mJ/cm^2$ and preferably 1,000 to 2,000 $mJ/cm^2$ when the amount is measured by the cumulative illuminometer using the light receptor of 365 nm. An irradiation time is generally 0.1 to 120 sec, typically 1 to 30 sec and more typically about 10 to 20 sec.

The full fastening process (7) may also be a stand-still process of allowing the fixing agent present in the provisionally fastened translucent rigid substrate laminate to stand without irradiating light to cure the uncured fixing agent, thereby forming the fully fastened translucent rigid substrate laminate. This solves the aforementioned problem that the uncured fixing agent remains on the underside of the printing pattern to deteriorate processability. In the case of performing the stand-still process, cure shrinkage hardly occurs since curing slowly proceeds. Thus, it is not necessary to perform this process while the substrates are pressurized. A stand-still temperature of this stand-still process is preferably 10 to 35° C., more preferably 15 to 30° C. and even more preferably 20 to 28° C. Further, though dependent on the stand-still temperature, a stand-still time of this stand-still process is preferably 1 hour or longer, more preferably 1 to 24 hours, further preferably 2 to 16 hours and even more preferably 4 to 12 hours.

Before the process (7), bubbles mixed in with the uncured fixing agent are preferably moved to a position where shape processing is not performed. The reason for this is explained below. There is a case where bubbles enter a fixing agent layer while provisional fastening is performed. If full irradiation is performed in a state where bubbles are present, the bubbles are fixed at that position due to the curing of the fixing agent. If the bubbles are present at the position that is subjected to shape processing such as cutting processing, external shape processing or perforation processing, in other words, the position that is directly in contact with a processing tool (blade or whetstone), chipping occurs. Accordingly, it is possible to prevent the occurrence of chipping by moving the bubbles to the position where shape processing is not performed in advance before the full irradiation is performed. As a moving means, there is a method of moving bubbles by pressing the substrates by hands or rods.

In the process (8), the processes (1) to (7) are repeated at least once by regarding the fully fastened translucent rigid substrate laminate obtained in the process (7) as the first translucent rigid substrate. Accordingly, the fully fastened translucent rigid substrate laminate in which at least three translucent rigid substrates are bonded is obtained. In view of improvement in production efficiency of the plate-shaped product, it is preferable to manufacture the translucent rigid substrate laminate in which ten or more translucent rigid substrates, typically ten to thirty translucent rigid substrates are laminated.

Second Embodiment

In a second embodiment of the method of manufacturing a translucent rigid substrate laminate according to the present invention, the following processes are performed:

1) a process of preparing a first translucent rigid substrate,
2) a process of preparing a second translucent rigid substrate,
3) a process of applying a photo-curable fixing agent including (A) polyfunctional (meth)acrylate, (B) monofunctional (meth)acrylate and (C) a photopolymerization initiator to a first surface of the first translucent rigid substrate and/or a first surface of the second translucent rigid substrate,
4) a process of allowing the first surface of the first translucent rigid substrate and the first surface of the second translucent rigid substrate to face each other so that both surfaces are parallel to each other in a predetermined positional relationship in a surface direction,
5) a process of applying a given pressure to the first surface of the first translucent rigid substrate and the first surface of the second translucent rigid substrate while maintaining the positional relationship to bond the both translucent rigid substrates,
6) a process of irradiating light for curing only an outer peripheral portion of the fixing agent spreading between the both translucent rigid substrates to form a provisionally fastened translucent rigid substrate laminate,
7') a process of repeating the processes 1) to 6) at least once by regarding the provisionally fastened translucent rigid substrate laminate as the first translucent rigid substrate to form a provisionally fastened translucent rigid substrate laminate in which at least three translucent rigid substrates are bonded, and
8') a full fastening process of curing the uncured fixing agent present in the provisionally fastened translucent rigid substrate laminate obtained in the process 7') to form a fully fastened translucent rigid substrate laminate.

The processes (1) to (6) are performed in the same procedure as in the first embodiment.

After the process (6), in the present embodiment, the processes (1) to (6) are repeated at least once by regarding the provisionally fastened translucent rigid substrate laminate as the first translucent rigid substrate, and the process (7') of forming the provisionally fastened translucent rigid substrate laminate in which at least three translucent rigid substrates are bonded is performed. In the first embodiment, immediately after the provisionally fastened translucent rigid substrate laminate in which two translucent rigid substrates are laminated is obtained, the full irradiation is performed to obtain the fully fastened translucent rigid substrate laminate. That is, every time the provisional irradiation is finished, the full irradiation is performed. In the second embodiment, the full irradiation is not performed immediately after the provisionally fastened translucent rigid substrate laminate is obtained, but the provisionally fastened laminate formed of a plurality of translucent rigid substrates is manufactured by repeating the processes (1) to (6).

Thereafter, in the process (8'), the uncured fixing agent present in the obtained provisionally fastened translucent rigid substrate laminate is cured to form the fully fastened translucent rigid substrate laminate.

The full fastening process (8') may be a full irradiation process (8') of forming a fully fastened translucent rigid substrate laminate by irradiating light for curing the uncured fixing agent present in the obtained provisionally fastened translucent rigid substrate laminate. Since the full irradiation is performed once for the provisionally fastened laminate formed of a plurality of translucent rigid substrates, the number of times of the full irradiation necessary to manufacture the fully fastened translucent rigid substrate laminate formed of a plurality of translucent rigid substrates can be reduced and production efficiency is improved. However, if the provisionally fastened laminate is formed of an excessively large number of translucent rigid substrates, ultraviolet rays cannot reach the fixing agent inside when the full irradiation is performed and the fixing agent tends to be insufficiently cured. Thus, the provisionally fastened laminate is preferably formed of at most five translucent rigid substrates. The process (8') is also preferably performed while a given pressure is applied to the bonded translucent rigid substrate surfaces as in the process (7) to increase bonding position precision. Further, for the same reasons mentioned in the description of the process (7), bubbles mixed in with the uncured fixing agent are preferably moved to a position where shape processing is not performed before the process (8').

Similarly to the full fastening process (7), the full fastening process (8') may be a stand-still process of allowing the uncured fixing agent present in the obtained provisionally fastened translucent rigid substrate laminate to stand without irradiating light to form the fully fastened translucent rigid substrate laminate.

Third Embodiment

In a third embodiment of the method of manufacturing a translucent rigid substrate laminate according to the present invention, processes (1) to (8') are performed in the same procedure as in the second embodiment, and subsequent to these processes, the method further includes:

8") a process of repeating the processes 1) to 6) at least once by regarding the fully fastened translucent rigid substrate laminate obtained in the process 8') as the first translucent rigid substrate to form a complex translucent rigid substrate laminate, and 8''') a full fastening process of curing the uncured fixing agent present in the complex translucent rigid substrate laminate obtained in the process 8") to form a fully fastened translucent rigid substrate laminate having an increased lamination number.

The full fastening process 8''') may be an irradiation process of irradiating light for curing the uncured fixing agent present in the complex translucent rigid substrate laminate obtained in the process (8") to form the fully fastened translucent rigid substrate laminate having an increased lamination number.

In the present embodiment, a fully fastened translucent rigid substrate laminate having an increased lamination number is manufactured by further laminating a translucent rigid substrate laminate on a fully fastened translucent rigid substrate laminate. Since there is a limit to the number of the translucent rigid substrates constituting the provisionally fastened laminate as described above, the provisionally fastened laminate having reached a certain lamination number needs to be fully fastened to form the fully fastened translucent rigid substrate laminate.

However, it is possible to manufacture a fully fastened translucent rigid substrate laminate formed of a plurality of translucent rigid substrates while reducing the number of times of the full irradiation by laminating translucent rigid substrates in such a procedure as to repeat the bonding of the translucent rigid substrate to the fully fastened translucent rigid substrate laminate and the provisional irradiation and perform the full fastening when the number of the translucent rigid substrates reaches a certain number. Similarly to the full fastening process (7), the full fastening process (8''') is also preferably performed while a given pressure is applied to the bonded translucent rigid substrate surfaces to increase bonding position precision. Further, for the same reasons mentioned in the description of the process (7), bubbles mixed in with the uncured fixing agent are preferably moved to a position where shape processing is not performed before the process (8''').

Similarly to the full fastening process (7), the full fastening process 8''') may be a stand-still process of allowing the uncured fixing agent present in the complex translucent rigid substrate laminate obtained in the process (8") to stand to form the fully fastened translucent rigid substrate laminate having the increased lamination number.

In the method of manufacturing a translucent rigid substrate laminate according to the present invention, a plurality of the processes may be performed in parallel. In one embodiment of the method of manufacturing a translucent rigid substrate laminate according to the present invention, operations of manufacturing a translucent rigid substrate laminate are simultaneously performed, the translucent rigid substrate being manufactured proceeds to the next process after one process is finished and one process is continuously performed, whereby a plurality of translucent rigid substrate laminates can be simultaneously manufactured in parallel and efficiently manufactured. For example, to simultaneously manufacture four translucent rigid substrate laminates in parallel, translucent rigid substrates are simultaneously manufactured in parallel, one in each of the process (1) to (3), the process (4), the process (5) to (6) and the process (8') or (8'''). After each process is finished, a transition is made to the next process. By continuing one process, the translucent rigid substrates can be efficiently manufactured.

<Manufacturing of the Plate-Shaped Product>

The plate-shaped product may be manufactured from the translucent rigid substrate laminate obtained by the above method of manufacturing a translucent rigid substrate laminate.

First, in a process (9), the translucent rigid substrate laminate is divided in a thickness direction to form a desired number of divided translucent rigid substrate laminates. A division method is not particularly limited, but examples thereof may include a method of division into rectangular parallelepiped forms having the same size by using a disk cutter (diamond disk, cemented carbide disk), a fixed abrasive type or loose abrasive type wire saw, a laser beam, etching (for example: chemical etching or electrolytic etching using hydrofluoric acid, sulfuric acid or the like), and red heat zone (a nichrome wire) alone or in combination. The etching may be used in surface treatment of a cut surface after the division.

Next, in a process (10), desired shape processing is performed on each of the divided translucent rigid substrate laminates. In this process, since each of the divided translucent rigid substrate laminates may be integrally processed into the form of a desired translucent rigid substrate product, there is an advantage of significantly increasing a production speed of the translucent rigid substrate product. The shape processing may be performed by any known means, and examples thereof may include grinding by a grindstone, perforation by an ultrasonic vibration drill, edge face processing by a rotary brush, perforation by etching, edge face processing by etching, external shape processing by etching, flame processing using a burner and the like. The processing methods may be used alone or in combination. The etching may also be used in surface treatment after the shape processing.

Even if a printing pattern is formed on a surface of a translucent rigid substrate and division processing or shape processing is performed to cut this printing pattern, it is possible to process with high position precision while preventing chipping by performing the full fastening process by the aforementioned stand-still process.

In a process (11), the bonded translucent rigid substrates are delaminated and a plurality of translucent rigid substrate products are formed by heating the translucent rigid substrate laminate after the shape processing. A heating method is not particularly limited, but since the fixing agent is softened in a film form and smoothly separated from each translucent rigid substrate product, a method of immersing the translucent rigid substrate laminate after the shape processing in warm water is preferable. An appropriate temperature of warm water differs depending on the used fixing agent, but generally about 60 to 95° C. and preferably 80 to 90° C.

Figure 16:
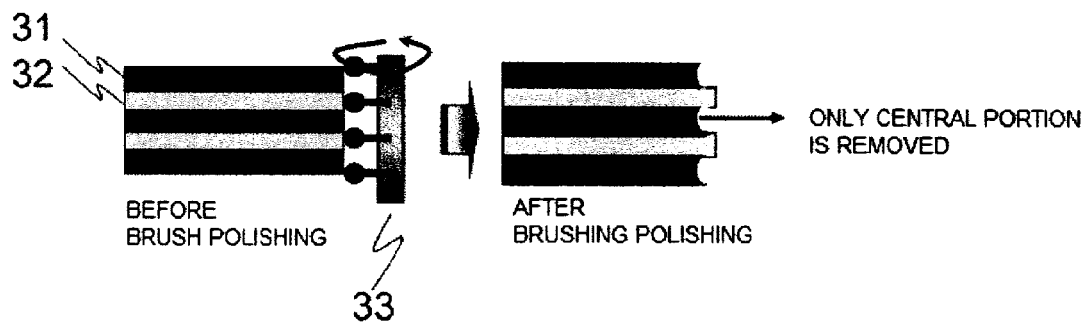
FIG. 16 is a schematic diagram illustrating a state where the fixing agent acts as an obstacle and the substrates are not chamfered when an edge face of a substrate laminate is processed.

Here, the edge face of the translucent rigid substrate laminate divided by the process (9) has a flat surface formed by a translucent rigid substrate 31 and a fixing agent 32. If this edge face is processed by a rotary brush 33 or the like, corner portions of each translucent rigid substrate are not chamfered but, on the contrary, a central portion is excessively cut because the fixing agent acts as an obstacle (FIG. 16), such that impact resistance of the translucent rigid substrate becomes insufficient. Accordingly, adhesion strength of the outer edge of the fixing agent exposed on the edge face of the divided translucent rigid substrate laminate is preferably weakened so that each translucent rigid substrate is chamfered when the edge face is processed.

Figure 17:
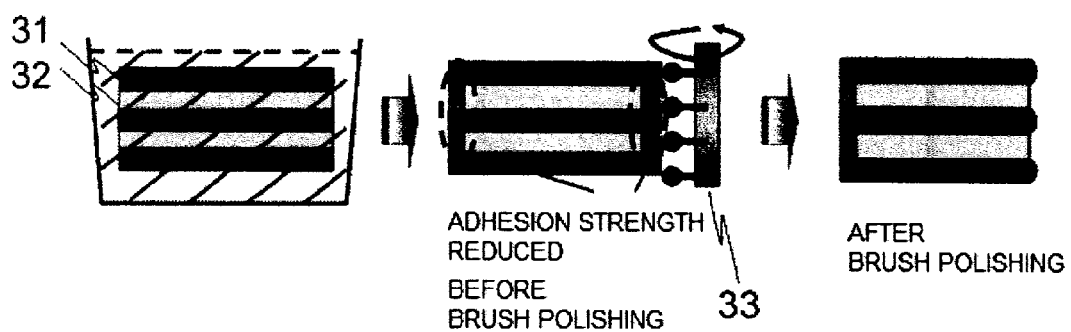
FIG. 17 is a schematic diagram illustrating a state where each substrate is chamfered due to a reduction in adhesion strength of an exposed portion of the outer edge of the fixing agent when the edge face of the substrate laminate is processed.

Specific examples of the method may include a method of bringing the divided translucent rigid substrate laminates into contact with a delaminating agent under temperature and time conditions required to reduce adhesion strength of an exposed portion of the outer edge of the fixing agent interposed between the translucent rigid substrates (for example: immersion, spraying, coating and the like) between the processes (9) and (10) (FIG. 17).

The adhesion strength needs to be reduced in a very small region that is about 1 mm or less inwardly of the outer edge, and the temperature and the time are required to be controlled so as not to reduce the adhesion strength of the entire bonding surfaces. Although depending on the delaminating agent used, a liquid temperature is generally 50° C. or lower and typically 20 to 40° C. A contact time is generally 30 min or less and typically 1 to 20 min. If the liquid temperature of the delaminating agent is excessively high or the contact time is excessively long, the adhesion strength is easily reduced even in an inner area between the bonding surfaces. Thus, attention should be given to this point.

The delaminating agent is not particularly limited as long as the delaminating agent is a liquid capable of reducing adhesion strength of the fixing agent, may be appropriately selected according to a property of the fixing agent used, and generally includes one, two or more kinds selected from a solvent, an oxidizing agent, and a surfactant.

In the case where the solvent and/or the surfactant are used as the delaminating agent, since the fixing agent coming into contact with the delaminating agent swells to cause distortion at an interface with the substrate, adhesion strength is reduced. Preferably, the swollen fixing agent is cut (incised) by a physical means such as a cutter, and then dried. Accordingly, since the swollen fixing agent shrinks, it is easier to perform edge face processing by a brush or the like. In the case where the oxidizing agent is used as the delaminating agent, the adhesion strength is reduced by carbonizing the fixing agent to cause embrittlement. Accordingly, the adhesion strength may be synergistically reduced by using the oxidizing agent in combination with the solvent and/or surfactant.

The solvent may be either an inorganic solvent or an organic solvent, and examples thereof may include water, hydrofluoric acid, hydrochloric acid, alcohols (for example: methanol, ethanol, n-propanol, isopropanol, butanol, and benzyl alcohol), esters (for example: ethyl acetate, butyl acetate, normalpropyl acetate, ethyl lactate, dimethyl phthalate, and dimethyl adipate), ketones (for example: methylethylketone (MEK), methylisobutylketone (MIBK), and acetone), chlorine-based solvent (for example: methylene chloride, trichloroethylene, tetrachloroethylene), fluorine-based solvent (for example: hydrochlorofluorocarbon (HCFC), hydrofluorocarbon (HFC)), glycolethers (for example: ethyleneglycolmonomethylether (methylcello), ethyleneglycolmonoethylether (ethylcello), ethyleneglycolmonobutylether (butylcello), butylcarbitol (butycarbi), ethyleneglycolmono-t-butyl ether (ETB), propyleneglycolmonomethylether (PGME), propyleneglycolmonomethylether acetate (PGMEA), 3-methoxy-3-methyl-1-butanol (MMB)), amine-based solvent (for example: N-methyl-2-pyrrolidone (NMP), dimethylformamide (DMF), and N,N-dimethylacetamide (DMAC)), ethers (for example: ethylethoxy propionate (EEP) and tetrahydrofuran (THF)), and dimethyl sulfoxide (DMSO).

Among the solvents, alcohol may be typically used and benzyl alcohol may be preferably used.

Examples of the oxidizing agent may include sulfuric acid, nitric acid, hydrogen peroxide, ammonium persulfate, acyl peroxide, benzoyl peroxide, tert-butyl peroxide, hydroperoxide, ozone water, perchloric acid, hypochlorous acid and the like.

Any one of an anionic surfactant, a cationic surfactant, an ampholytic surfactant, and a nonionic surfactant may be used as the surfactant.

Examples of the anionic surfactant may include a carboxylic acid type (for example: fatty acid salts, polyoxyethylene alkyl ether carboxylate, N-acylsarcosinate, N-acylglutamate), a sulfuric ester type (for example: alkyl sulfate ester salt, polyoxyethylenealkylether sulfate, alcoholethoxy sulfate, fatty oil sulfate ester salt), a sulfonic acid type (for example: alkylbenzene sulfonate, alkane sulfonate, alpha-olefine sulfonate, dialkyl sulfosuccinic acid, naphthalene sulfonate-formaldehyde condensate, alkyl naphthalene sulfonate, N-methyl-N-acyl taurate), and a phosphate ester type (for example: alkyl phosphate, polyoxyethylenealkylether phosphate, polyoxyethylenealkylphenylether phosphate), and the like.

Examples of the cationic surfactant may include an amine salt type (for example: alkylamine acetate), and a quaternary ammonium salt type (for example: monoalkylammonium salt, dialkylammonium salt, and ethoxylated ammonium salt).

Examples of the ampholytic surfactant may include a betaine type (for example: alkyldimethylaminoacetic acid betaine, alkylamidepropylbetaine, alkylhydroxysulfobetaine, and alkylhydroxysulfobetaine), alkyldimethylamine oxide and the like.

Examples of the nonionic surfactant may include an ester type (for example: glycerin fatty acid ester, propylene glycol fatty acid ester, sorbitan fatty acid ester, and sucrose fatty acid ester), an ether type (for example: polyoxyethylenealkylether, polyoxyethylenealkylphenylether, and polyoxyethylenepolyoxypropyleneether), an ether ester type (for example: polyoxyethylene sorbitan fatty acid ester and alkylglyceryl ether), an alkylalkanolamide type (fatty acid alkanol amide, fatty acid amidealkylene oxide adducts), and alkylpolyglycoside.

Among the surfactants, the anionic surfactant may be typically used, and the sulfonic acid type anionic surfactant may be preferably used.

The delaminating agent preferably includes one, two or more kinds selected from water, alcohols, an oxidizing agent and a surfactant in views of safety and environment, and the delaminating agent more preferably include three kinds of water, alcohols, and the surfactant in view of safety. In this case, the delaminating agent preferably includes water, alcohols and the surfactant in a mass ratio of 30 to 50:30 to 50:5 to 20, for example, in a mass ratio of 30 to 40:40 to 50:10 to 20. The delaminating agent may be constituted by only these three kinds.

As an example, a delaminating agent was manufactured by mixing water, benzyl alcohol and the sulfonic acid type anionic surfactant in a mass ratio of 35:50:15. Further, a plate glass laminate formed of twenty plate glasses was manufactured by using a fixing agent (I) mentioned in Examples to be described below as the fixing agent and using the method according to the present invention. This plate glass laminate was immersed in the delaminating agent at 35° C. for 5 min, and an edge face thereof was then processed by the rotary brush. The edge face after processing was observed by a microscope to find out that corner portions of each plate glass were circularly chamfered. Meanwhile, in the case where edge face processing was performed without immersion in the delaminating agent, the corner portions of each plate glass were not chamfered.

Likewise, a plate glass laminate formed of twelve plate glasses was manufactured by using the method according to the present invention. This plate glass laminate was immersed in the delaminating agent at 35° C. for 5 min, and an edge face thereof was then processed by the rotary brush. The edge face after processing was observed by the microscope to find out that the corner portions of each plate glass were chamfered. Meanwhile, in the case where edge face processing was performed without immersion in the delaminating agent, the corner portions of each plate glass were not chamfered.

<Configuration Example of the Apparatus>

An example of the translucent rigid substrate bonding apparatus according to the present invention will be described. The translucent rigid substrate bonding apparatus according to the present invention is used to manufacture a provisionally fastened translucent rigid substrate laminate in which only outer peripheral portions of bonding surfaces of substrates are adhered by an adhesive. An uncured fixing agent present between the bonding surfaces of the substrates may be cured during a subsequent process to manufacture the fully fastened translucent rigid substrate laminate in which the translucent rigid substrates are completely bonded and the entire bonding surfaces of the substrates are adhered by the adhesive.

The fully fastened translucent rigid substrate laminate may be divided in a thickness direction to form a desired number of the divided translucent rigid substrate laminates. Desired shape processing is performed on each of the divided translucent rigid substrate laminates, and the bonded translucent rigid substrates may be delaminated to form a plurality of plate-shaped products by heating (for example: immersion in warm water) the translucent rigid substrate laminates after the shape processing.

Each of the translucent rigid substrates to be bonded may be a single translucent rigid substrate, or may be a laminate formed of two or more translucent rigid substrates. The laminate of the translucent rigid substrates may be a provisionally fastened translucent rigid substrate laminate manufactured by the translucent rigid substrate bonding apparatus according to the present invention or a subsequently fully fastened translucent rigid substrate laminate. Typically, it is intended to manufacture a translucent rigid substrate laminate, in which about ten to thirty translucent rigid substrates are laminated, by using the translucent rigid substrate bonding apparatus according to the present invention.

FIG. 1 is a schematic diagram illustrating a first example of the translucent rigid substrate bonding apparatus according to the present invention. A translucent rigid substrate bonding apparatus 10 includes a rack 11, an upper stage 12, a press unit 13, a suction unit 14, suction holes 15, LED units 16, a lower stage 17, a lower stage moving means 18, a side clamp 19, a lower substrate coating unit 20, an upper substrate coating unit 21, an imaging unit 22, and an electric component unit 23.

The rack 11 is a base portion on which each constituent component of the translucent rigid substrate bonding apparatus 10 is mounted, and the electric component unit 23 is disposed therein. The electric component unit 23 performs a sequence control of each constituent component by a programmable logic controller (PLC).

Figure 2:
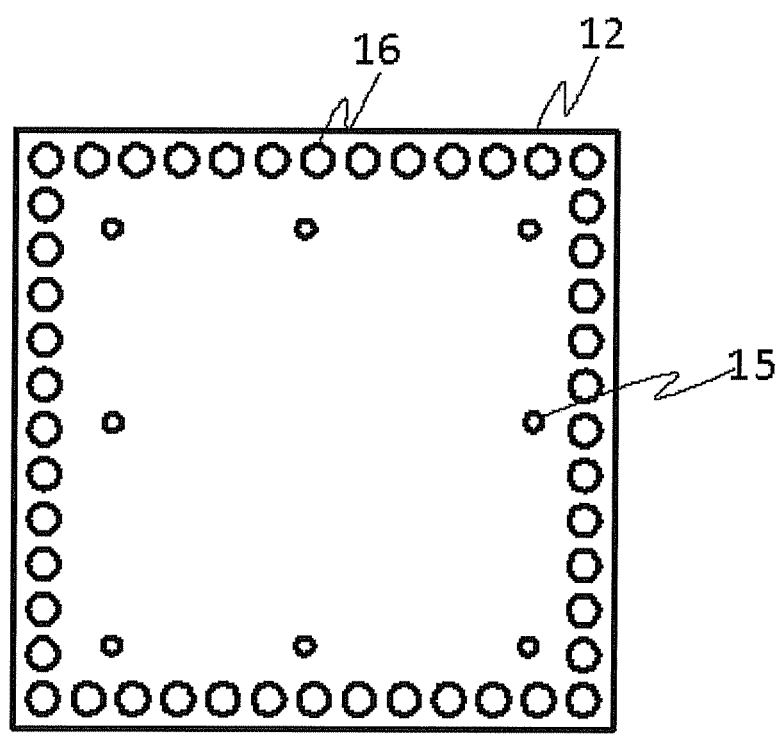
FIG. 2 is a schematic diagram illustrating an example of a lower surface of an upper stage.

The upper stage 12 holds an upper translucent rigid substrate 25 by vacuum suction. Accordingly, a plurality of suction holes 15 are formed in a lower surface of the upper stage 12, and the suction holes 15 are connected to the suction unit 14 through pipes. FIG. 2 is a schematic diagram of the lower surface of the upper stage 12, and illustrates an arrangement example of the suction holes 15. A vacuum pump, a vacuum ejector and the like may be used as the suction unit 14.

The press unit 13 for bonding the substrates while pressing the upper translucent rigid substrate 25 against a lower translucent rigid substrate 24 is connected to an upper portion of the upper stage 12. The press unit 13 has an elevating cylinder (not shown) that can move the upper stage 12 in a Z direction (vertical direction), and can control a pressing force, a moving speed, a pressing time and a height by a servo motor.

A plurality of LED units 16 for irradiating ultraviolet rays for curing the fixing agent to the upper translucent rigid substrate 25 are embedded in the lower surface of the upper stage 12. The LED units 16 are arranged along the outer periphery of the upper translucent rigid substrate 25 sucked to the upper stage 12. FIG. 2 illustrates an example of an arrangement state of the LED units 16. The width of the outer peripheral portion to be irradiated may be increased by arranging the LED units 16 not only in a row, but also in two or more rows in parallel. As described above, the LED units 16 need not be arranged over the entire outer peripheral portion and it is also possible to perform spot irradiation on parts (e.g. four corners).

An LED irradiation time to the translucent rigid substrates is controlled by turning ON/OFF of a power supply. Light may be irradiated in an amount required to provisionally fasten the translucent rigid substrates, and when the amount is measured by a cumulative illuminometer using a light receptor of 365 nm, the amount may be generally 1 to 500 mJ/cm$^2$, typically 50 to 450 mJ/cm$^2$ and more typically 200 to 400 mJ/cm$^2$. The irradiation time is generally 1 to 120 sec and typically about 2 to 60 sec.

The lower stage 17 holds the lower translucent rigid substrate 24 and receives a pressure from the upper stage 12 during pressing. The lower stage 17 can be moved in an X-axis direction, a Y-axis direction and a θ-axis direction by the lower stage moving means 18. The lower stage moving means 18 is composed of a θ table enabling a horizontal rotating motion and an X table and a Y table enabling a horizontal movement. These tables are driven by motors. The side clamp 19 that is driven by a motor and can be moved in the X-axis direction and the Y-axis direction to position the mounted translucent rigid substrate is provided on the upper surface of the lower stage 17. A positioning stopper for mounting the translucent rigid substrate at a given position may be provided on the upper surface of the lower stage 17 instead of the side clamp 19. In this case, the translucent rigid substrate is manually mounted at a position at which the translucent rigid substrate is fixed by the stopper. Further, in order to prevent misalignment of the translucent rigid substrates, the lower translucent rigid substrate 24 may also be held by vacuum suction similarly to the upper stage 12.

The lower substrate coating unit 20 is provided with a dispenser 20a for the photo-curable fixing agent and a robot 20b that is connected to the dispenser 20a, can be moved in X-, Y- and Z-axis directions and is driven by a motor, and the fixing agent may be applied in any arbitrary pattern to the upper surface of the lower translucent rigid substrate 24. The fixing agent is filled in a syringe, and automatically and quantitatively discharged. A coating amount is controlled by a digital pressure meter and a coating speed.

The upper substrate coating unit 21 automatically applies the photo-curable fixing agent to the lower surface of the upper translucent rigid substrate 25 while the upper translucent rigid substrate 25 is held on the upper stage 12. A coating amount is controlled by a pressure gauge and a coating time. The upper substrate coating unit 21 is provided with a robot 21b that has a rotation shaft rotatable in the horizontal direction beside the upper and lower stages and is driven by a motor, a rotary nozzle 21a at an end thereof is disposed below the vicinity of the center of the upper stage 12 during coating, and the fixing agent is applied from the tip of the nozzle 21a. When the coating is finished, the upper substrate coating unit 21 is stored beside the upper and lower stages so as not to hinder the bonding of the translucent rigid substrates.

The imaging unit 22 images an alignment mark for position alignment provided on each surface of the upper translucent rigid substrate 25 and the lower translucent rigid substrate 24 by digital cameras 22a attached at two upper and lower positions of a tip part of an arm. The electric component unit 23 detects a relative misalignment state of the upper translucent rigid substrate 25 and the lower translucent rigid substrate 24 based on obtained image information. An operation of finely adjusting the position of the lower stage 17 in the X-axis direction, the Y-axis direction and the O-axis direction by the lower stage moving means 18 to correct the misalignment is performed based on a detection result. After the correction of the misalignment, the both translucent rigid substrates are bonded. An analogue camera may be used as the camera in addition to the digital camera using a CCD or CMOS as an imaging element, but the digital camera is preferable in view of high resolution.

The imaging unit 22 is provided with a moving means 22b that is driven in the X- and Y-axis directions by motors, and the digital cameras 22a are moved to a given position at which the alignment marks enter visual fields when imaging is performed. When the imaging is finished, the digital cameras 22a are moved so as not to hinder the bonding of the translucent rigid substrates.

The procedure of bonding the translucent rigid substrates using the translucent rigid substrate bonding apparatus 10 according to the first example will be described with reference to FIGS. 3 to 13.

Figure 3:
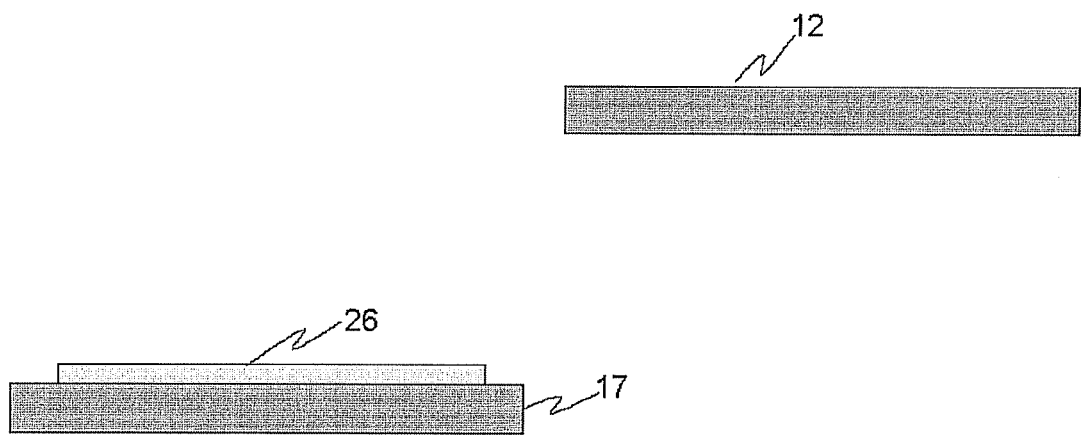
FIG. 3 is a view illustrating a state where a first substrate is mounted on a lower stage.
Figure 4:
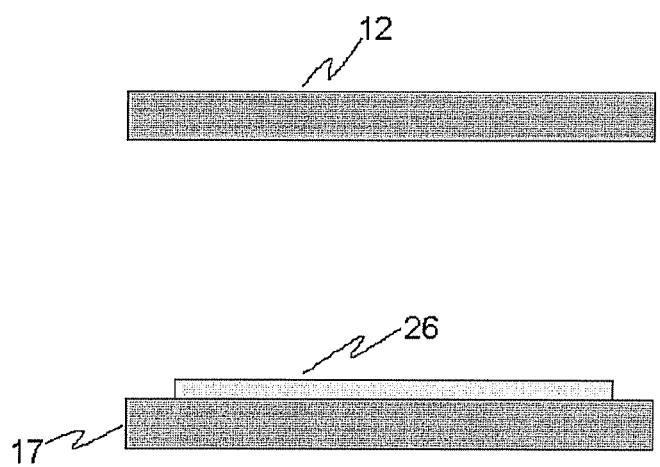
FIG. 4 is a view illustrating a state where the first substrate mounted on the lower stage is conveyed to a position directly below the upper stage.
Figure 5:
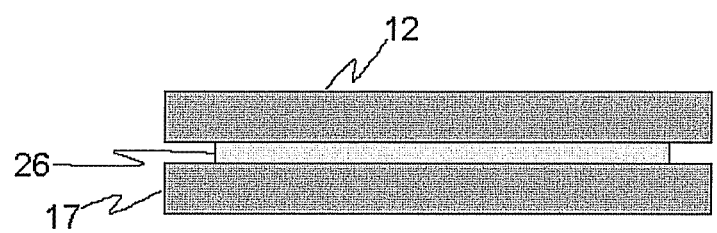
FIG. 5 is a view illustrating a state where the upper stage is lowered to vacuum-suck the first substrate.
Figure 6:
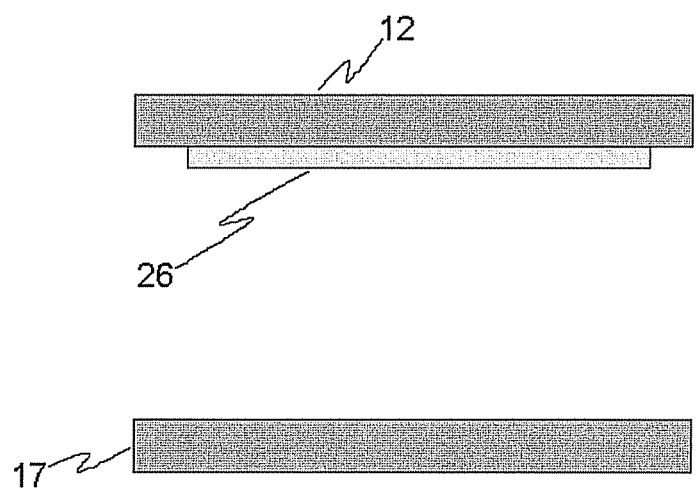
FIG. 6 is a view illustrating a state where the upper stage is raised while carrying the sucked first substrate.

First, a first translucent rigid substrate 26 is mounted on the lower stage 17, and fixed at a given position by the side clamp 19 (not shown) (FIG. 3). The translucent rigid substrate 26 may be manually mounted on the lower stage 17, but a plurality of translucent rigid substrates 26 may be housed in a dedicated cassette and automatically mounted on the lower stage 17. The mounted translucent rigid substrate 26 is moved to a position directly below the upper stage 12 by the lower stage moving means 18 (not shown) (FIG. 4). Subsequently, the upper stage 12 is lowered by the press unit 13. The translucent rigid substrate 26 is vacuum-sucked by a suction force from the suction holes 15 (not shown) (FIG. 5). The sucked translucent rigid substrate 26 is raised together with the upper stage 12 while being held, and waits for a second substrate (FIG. 6).

Figure 7:
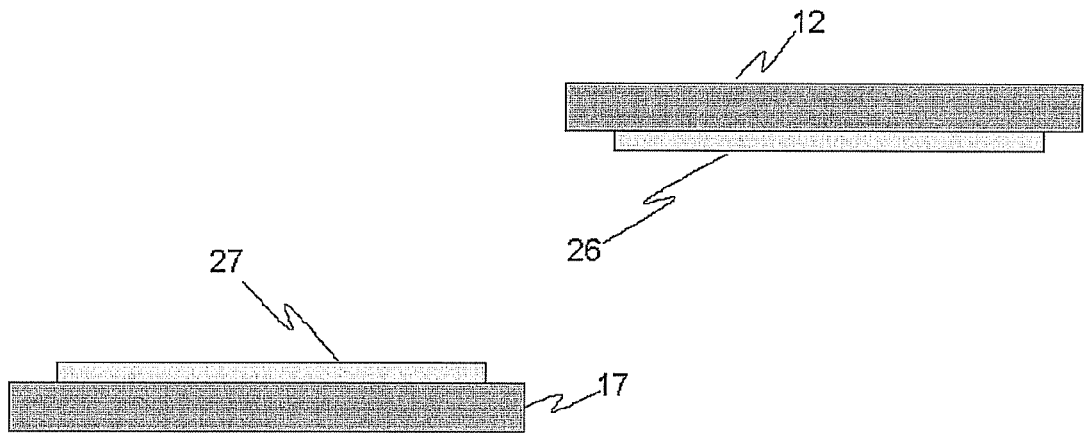
FIG. 7 is a view illustrating a state where a second substrate is mounted on the lower stage.
Figure 8:
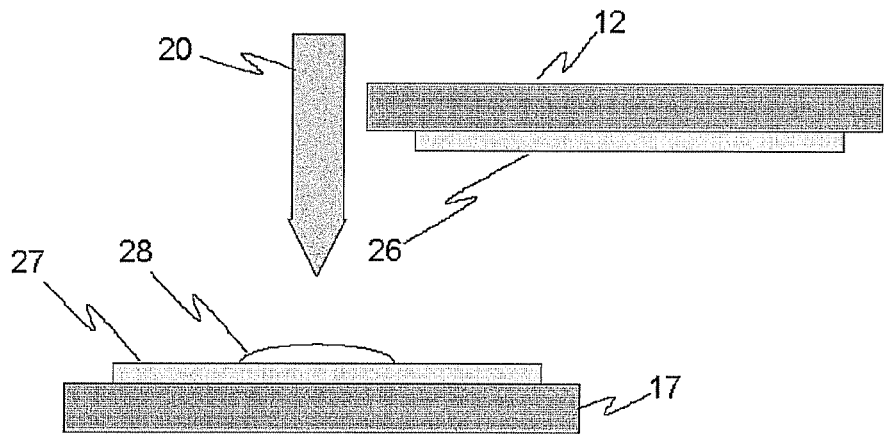
FIG. 8 is a view illustrating a state where a fixing agent is applied to an upper surface of the second substrate.
Figure 9:
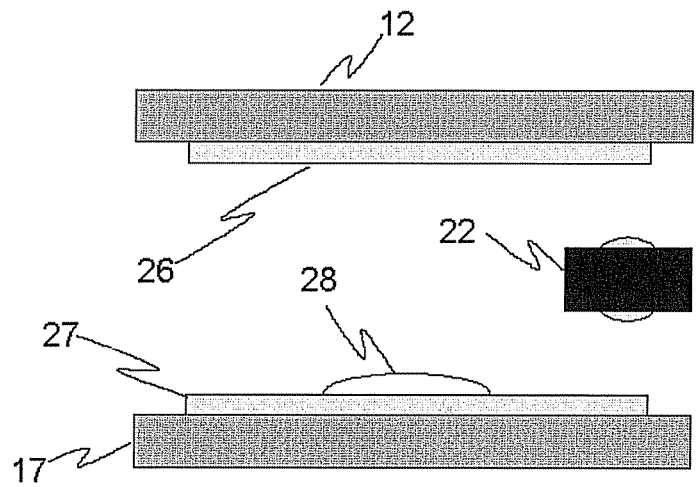
FIG. 9 is a view illustrating a state where the second substrate mounted on the lower stage is conveyed to the position directly below the upper stage and alignment marks attached to surfaces of the both substrates are imaged by cameras.

Subsequently, a second translucent rigid substrate 27 is mounted on the lower stage 17, and fixed at the given position by the side clamp 19 (not shown) (FIG. 7). A fixing agent 28 is applied in a predetermined pattern to the upper surface of the second translucent rigid substrate 27 from the lower substrate coating unit 20 (FIG. 8). After the coating is completed, the alignment marks are imaged by the cameras attached to the tip of the arm of the imaging unit 22, and the position of the lower stage 17 is finely adjusted according to an imaging result for the position adjustment of the both translucent rigid substrates (26, 27) (FIG. 9) when the second translucent rigid substrate 27 mounted on the lower stage 17 is moved to the position directly below the upper stage 12.

Figure 10:
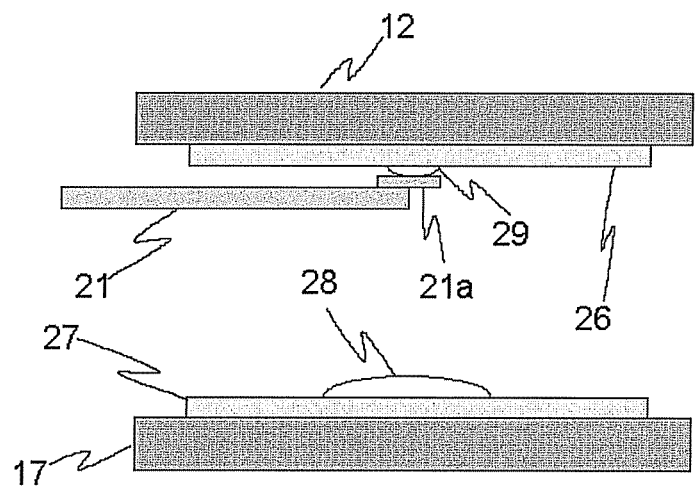
FIG. 10 is a view illustrating a state where the fixing agent is applied to a lower surface of the first substrate held on the upper stage.

After the position adjustment, the nozzle 21a attached to the tip of the arm of the upper substrate coating unit 21 is moved to the vicinity of the center of the first substrate 26 held on the upper stage 12, and a fixing agent 29 is applied to the lower surface of the first translucent rigid substrate 26 from the nozzle 21a (FIG. 10).

Figure 11:
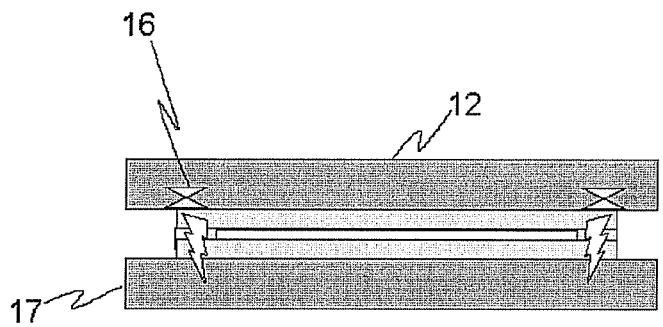
FIG. 11 is a view illustrating a state where the upper stage is lowered to bond two substrates and UV is irradiated to outer peripheral portions of the substrates.

When the upper stage 12 is lowered by the press unit 13 and the two translucent rigid substrates (26, 27) are bonded by being pressed after the fixing agents (28, 29) are applied to the upper and lower translucent rigid substrates (26, 27), the fixing agents (28, 29) interposed between the upper and lower translucent rigid substrates spread over the entire surfaces of the translucent rigid substrates by being pressed. While the pressing state is maintained, ultraviolet rays are irradiated from the LED units 16 to outer peripheral portions of the translucent rigid substrates (FIG. 11). Accordingly, only the fixing agent 31 present on the outer peripheral portions is cured. The fixing agent 30 inside is not cured and has fluidity, but does not leak from a gap between the both translucent rigid substrates since the fixing agent 31 on the outer peripheral portions is cured.

Figure 12:
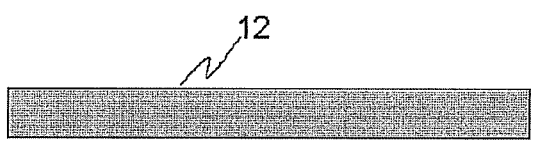
FIG. 12 is a view illustrating a state where the upper stage is raised after UV irradiation.
Figure 12:
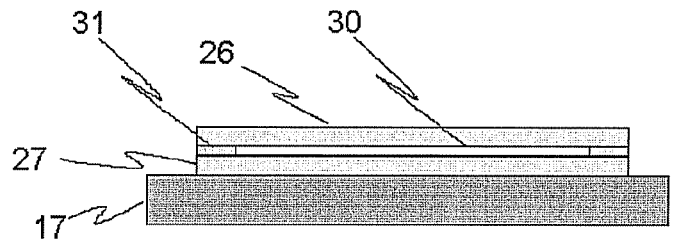
Figure 13:
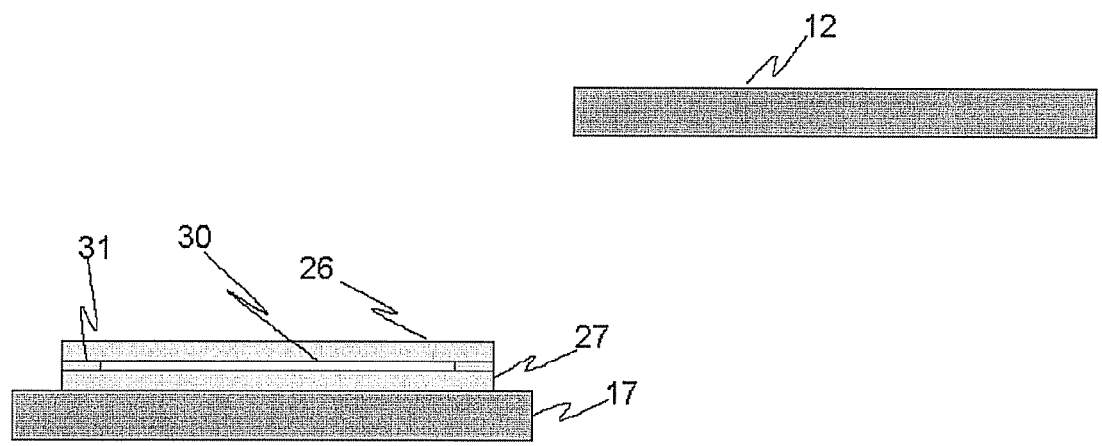
FIG. 13 is a view illustrating a state where the bonded substrates are conveyed back to an original position by the lower stage.

After ultraviolet rays are irradiated, suction to the upper substrate 26 is released, and only the upper stage 12 is raised (FIG. 12). The bonded translucent rigid substrates are conveyed back to the original position by the lower stage 17 (FIG. 13). The bonding of the translucent rigid substrates is completed by the aforementioned process.

Figure 14:
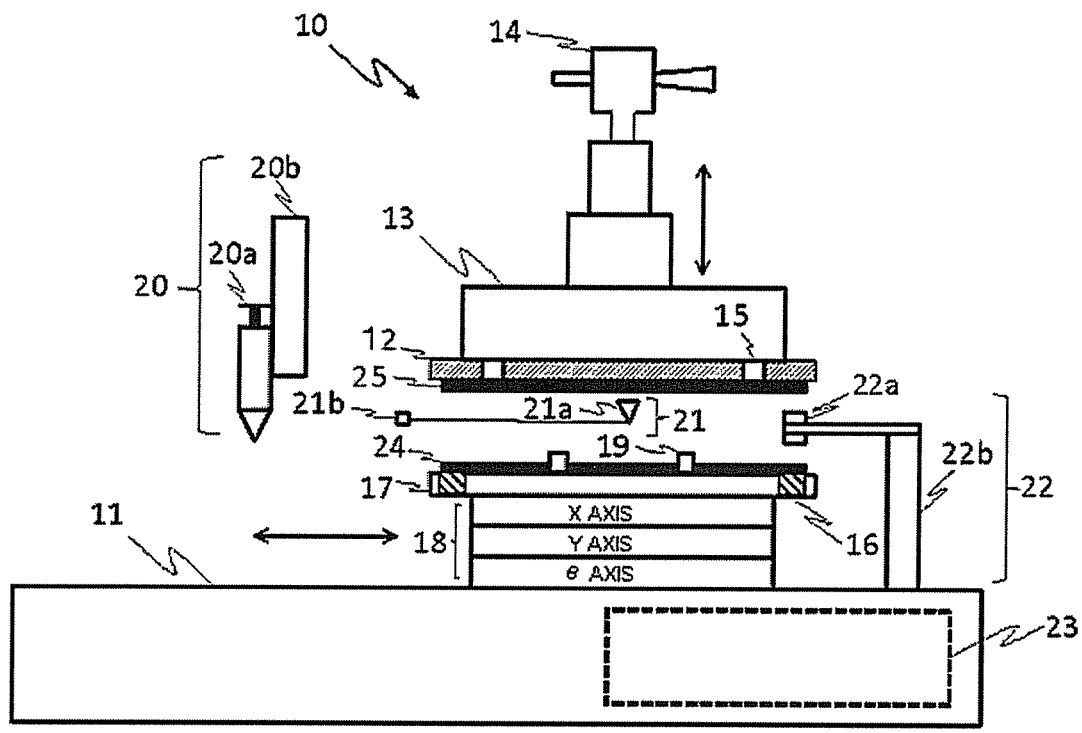
FIG. 14 is a schematic diagram illustrating a second example of the substrate bonding apparatus usable in the practice of the present invention.

FIG. 14 is a schematic diagram illustrating a second embodiment of the translucent rigid substrate bonding apparatus according to the present invention. In the present embodiment, LED units 16 are arranged along the outer periphery of a lower translucent rigid substrate 24 on the upper surface of a lower stage 17, and ultraviolet rays are irradiated upward.

Figure 15:
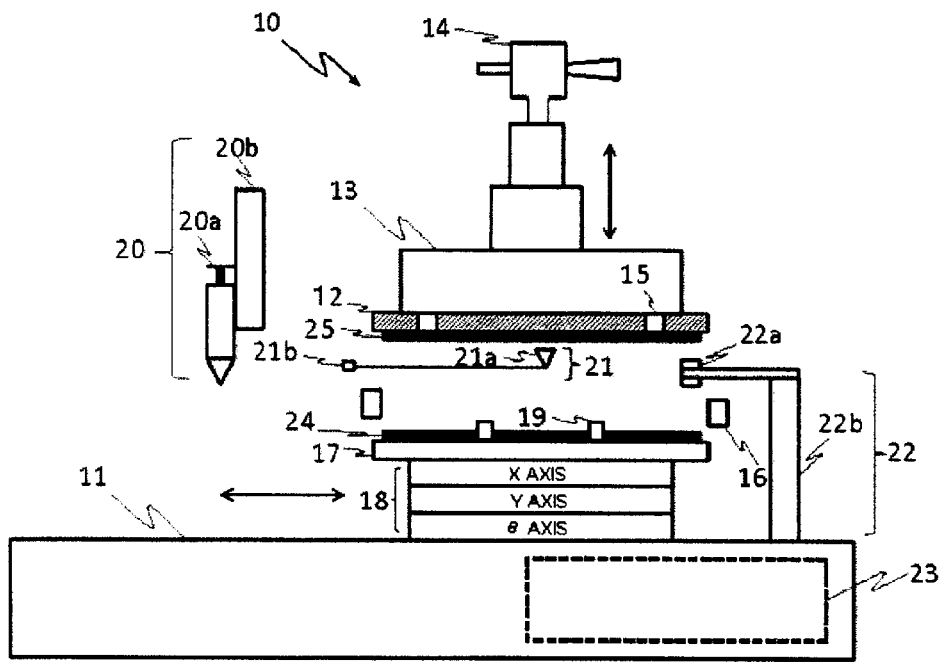
FIG. 15 is a schematic diagram illustrating a third example of the substrate bonding apparatus usable in the practice of the present invention.

FIG. 15 is a schematic diagram illustrating a third embodiment of the translucent rigid substrate bonding apparatus according to the present invention. LED units 16 are so arranged as to surround the outer peripheral side surfaces of both bonded translucent rigid substrates, and irradiate ultraviolet rays toward the outer peripheral side surfaces. The LED units 16 have a moving means in a Z-axis direction, and can be moved to an appropriate height according to the height of bonding surfaces.

EXAMPLES

First Example

As an example, when the processes (1) to (6) were performed under the following conditions to manufacture a provisionally fastened translucent rigid substrate laminate by using the translucent rigid substrate bonding apparatus shown in FIG. 1 according to the present invention, lamination precision could be examined and defects were easily repaired when the defects occurred. After the provisionally fastened translucent rigid substrate laminate was manufactured, the processes (7), (8) were further performed under the following conditions to manufacture a fully fastened translucent rigid substrate laminate, and subsequently, processing of the processes (9) to (10) was performed. When the obtained translucent rigid substrate laminate was delaminated according to the process (11), the fixing agent was softened in a film form and was smoothly separated from each plate-shaped product.

The following plate glasses were used as the translucent rigid substrates. Each plate glass used was a glass plate having dimensions of a width of 530 mm×a length of 420 mm×a thickness of 0.7 mm and attached with a plating pattern.

Fixing agent (I): A photo-curable fixing agent (I) was prepared by mixing the following components (A) to (E).

(A) As the polyfunctional (meth)acrylates, 15 parts by mass of "UV-3000B" manufactured by The Nippon Synthetic Chemical Industry Co., Ltd. (urethaneacrylate, hereinafter abbreviated as "UV-3000B", weight-average molecular weight of 15,000) and 15 parts by mass of dicyclopentanyl diacrylate ("KAYARAD R-684" manufactured by Nippon Kayaku Co., Ltd., hereinafter abbreviated as "R-684");

(B) As the monofunctional (meth)acrylates, 45 parts by mass of 2-(1,2-cyclohexacarboxylmide)ethyl acrylate ("ARONIX M-140" manufactured by TOAGOSEI CO., LTD., hereinafter abbreviated as "M-140") and 25 parts by mass of phenol 2 mol ethylene oxide-modified acrylate ("ARONIX M-101A" manufactured by TOAGOSEI CO., LTD.);

(C) As the photopolymerization initiator, 10 parts by mass of benzyldimethylketal ("IRGACURE651" manufactured by BASF Co., Ltd., hereinafter, abbreviated as "BDK"), (D) As the granular material, 1 part by mass of spherical crosslinked polystyrene particles with an average particle size of 100 μm ("GS-100S" manufactured by GANZ CHEMICAL CO., LTD.); and (E) As the polymerization inhibitor, 0.1 parts by mass of 2,2-methylene-bis(4-methyl-6-tertiarybutylphenol) ("Sumilizer MDP-S" manufactured by Sumitomo Chemical Co., Ltd., hereinafter abbreviated as "MDP").

In the process (3), 40 g of the fixing agent (I) was applied to each of both bonding surfaces of the plate glasses.

In the process (5), a pressure when bonding was performed was set to 20 g/cm$^2$, and an outer peripheral portion to be irradiated by the LED units 16 was set to have a width of about 12 mm. In the process (6), when the outer peripheral portion to be irradiated by the LED units 16 was set to have the width of about 12 mm and the photo-curable adhesive was cured, provisional fastening was performed with a UV irradiation amount set to 300 mJ/cm$^2$ (measured by a cumulative illuminometer with a light receptor of 365 nm) and a UV irradiation time set to 30 sec. In the process (7), an applied pressure was set to 20 g/cm$^2$, and full fastening was performed with a light irradiation amount, which was measured by the cumulative illuminometer by the light receptor of 365 nm, to 2,000 mJ/cm$^2$ and an irradiation time set to 20 sec. In the process (8), a plate glass laminate formed of twelve plate glasses was manufactured by using the fixing agent (I) and repeating the above procedure. In the process (9), a disk cutter (diamond disk) was used and the laminate was divided into rectangular parallelepiped forms (width of 100 mm×length of 55 mm×thickness of 9.6 mm). In the process (10), grinding by a grindstone, perforation by an ultrasonic vibration drill, and edge face processing by a rotary brush were sequentially performed for shape processing. In the process (11), this plate glass laminate was immersed in warm water of 85° C. to be delaminated.

Even if a fixing agent (II) and a fixing agent (III) were used instead of the fixing agent (I), effects similar to the above were obtained.

Fixing agent (II): The photo-curable fixing agent (II) was manufactured by mixing the following components (A) to (E).

(A) As the polyfunctional (meth)acrylates, 20 parts by mass of "UV-3000B" manufactured by The Nippon Synthetic Chemical Industry Co., Ltd. (urethaneacrylate, hereinafter abbreviated as "UV-3000B", weight-average molecular weight of 15,000) and 25 parts by mass of dicyclopentanyl diacrylate ("KAYARAD R-684" manufactured by Nippon Kayaku Co., Ltd., hereinafter abbreviated as "R-684");

(B) As the monofunctional (meth)acrylates, 35 parts by mass of 2-hydroxy-3-phenoxypropyl (meth)acrylate ("ARONIX M-5700" manufactured by TOAGOSEI CO., LTD., hereinafter abbreviated as "M-5700") and 20 parts by mass of phenol 2 mol ethylene oxide-modified acrylate ("ARONIX M-101A" manufactured by TOAGOSEI CO., LTD.);

(C) As the photopolymerization initiator, 10 parts by mass of benzyldimethylketal ("IRGACURE651" manufactured by BASF Co., Ltd., hereinafter, abbreviated as "BDK"), (D) As the granular material, 1 part by mass of spherical crosslinked polystyrene particles with an average particle size of 100 μm ("GS-100S" manufactured by GANZ CHEMICAL CO., LTD.); and (E) As the polymerization inhibitor, 0.1 parts by mass of 2,2-methylene-bis(4-methyl-6-tertiarybutylphenol) ("Sumilizer MDP-S" manufactured by Sumitomo Chemical Co., Ltd., hereinafter abbreviated as "MDP").

Fixing agent (III): The photo-curable fixing agent (III) was manufactured by mixing the following components (A) to (G).

<First Agent>

(A) As the polyfunctional (meth)acrylates, 15 parts by mass of "UV-3000B" manufactured by The Nippon Synthetic Chemical Industry Co., Ltd. (urethaneacrylate, hereinafter abbreviated as "UV-3000B", weight-average molecular weight of 15,000) and 15 parts by mass of dicyclopentanyl diacrylate ("KAYARAD R-684" manufactured by Nippon Kayaku Co., Ltd., hereinafter abbreviated as "R-684");

(B) As the monofunctional (meth)acrylates, 45 parts by mass of 2-(1,2-cyclohexacarboxylmide)ethyl acrylate ("ARONIX M-140" manufactured by TOAGOSEI CO., LTD., hereinafter abbreviated as "M-140") and 25 parts by mass of phenol 2 mol ethylene oxide-modified acrylate ("ARONIX M-101A" manufactured by TOAGOSEI CO., LTD.);

(C) As the photopolymerization initiator, 25 parts by mass of benzyldimethylketal ("IRGACURE651" manufactured by BASF Co., Ltd., hereinafter, abbreviated as "BDK"), (D) As the granular material, 1 part by mass of spherical crosslinked polystyrene particles with an average particle size of 100 μM ("GS-100S" manufactured by GANZ CHEMICAL CO., LTD.);

(E) As the polymerization inhibitor, 0.1 parts by mass of 2,2-methylene-bis(4-methyl-6-tertiarybutylphenol) ("Sumilizer MDP-S" manufactured by Sumitomo Chemical Co., Ltd., hereinafter abbreviated as "MDP");

(F) As the organic peroxide, 2 parts by mass of cumene hydroperoxide ("Percumyl H" manufactured by NOF Corporation, hereinafter abbreviated as "CHP").

<Second Agent>

(A) As the polyfunctional (meth)acrylates, 15 parts by mass of "UV-3000B" manufactured by The Nippon Synthetic Chemical Industry Co., Ltd. (urethaneacrylate, hereinafter abbreviated as "UV-3000B", weight-average molecular weight of 15,000) and 15 parts by mass of dicyclopentanyl diacrylate ("KAYARAD R-684" manufactured by Nippon Kayaku Co., Ltd., hereinafter abbreviated as "R-684");

(B) As the monofunctional (meth)acrylates, 45 parts by mass of 2-(1,2-cyclohexacarboxylmide)ethyl acrylate ("ARONIX M-140" manufactured by TOAGOSEI CO., LTD., hereinafter abbreviated as "M-140") and 25 parts by mass of phenol 2 mol ethylene oxide-modified acrylate ("ARONIX M-101A" manufactured by TOAGOSEI CO., LTD.);

(C) As the photopolymerization initiator, 25 parts by mass of benzyldimethylketal ("IRGACURE651" manufactured by BASF Co., Ltd., hereinafter, abbreviated as "BDK"), (D) As the granular material, 1 part by mass of spherical crosslinked polystyrene particles with an average particle size of 100 μm ("GS-100S" manufactured by GANZ CHEMICAL CO., LTD.);

(E) As the polymerization inhibitor, 0.1 parts by mass of 2,2-methylene-bis(4-methyl-6-tertiarybutylphenol) ("Sumilizer MDP-S" manufactured by Sumitomo Chemical Co., Ltd., hereinafter abbreviated as "MDP");

(G) As the decomposition promoter, 2 parts by mass of cobalt octylate ("cobalt octylate" manufactured by Shinto Paint Co., Ltd., hereinafter abbreviated as "Oct-Co").

Physical properties of the fixing agents (I), (II) and (III) are shown in TABLE-1. An evaluation method is as follows. The fixing agent (III) was obtained by measuring and mixing equal amounts of the first and second fixing agents and evaluated.

(Evaluation Method)

(1) Tensile shearing adhesion strength (adhesion strength): Measurement was made in accordance with JIS K 6850. Specifically, heat resistant Pyrex (registered trademark) glasses (25 mm×25 mm×2.0 mm) were used as adherends. An adhesion point was set to have a diameter of 8 mm, two heat resistant Pyrex (registered trademark) glasses were bonded using the manufactured fixing agent, which was cured under a condition of an integrated light amount of 2000 mJ/cm$^2$ at a wavelength of 365 nm by a curing apparatus manufactured by Fusion Systems Corporation and using an electrodeless discharge lamp, whereby tensile shearing adhesion strength test piece was manufactured. The tensile shearing adhesion strength of the manufactured test piece was measured at a tensile speed of 10 mm/min under an environment of a temperature of 23° C. and a humidity of 50% using a universal testing machine.

(2) Delamination test (delamination time in warm water of 80° C.): The fixing agent was applied to the above heat resistant Pyrex (registered trademark) glass, and the manufactured fixing agent was cured under the same conditions as the above except that a blue plate glass (150 mm×150 mm×thickness of 1.7 mm) was bonded as a support, thereby manufacturing a delamination specimen. The obtained specimen was immersed in warm water (80° C.) and a time required for the delamination of the heat resistant Pyrex (registered trademark) glass was measured.

(3) Maximum widths of chips of underside pieces of ten cut specimens and standard deviation of the maximum widths of the chips of the underside pieces of ten cut specimens: Using each of the fixing agents (I), (II) and (III), a heat resistant plate Pyrex (registered trademark) glass having a length of 150 mm×a width of 150 mm×a thickness of 2 mm and the blue plate glass (used as a dummy glass) used in the delamination test were adhered and cured in a manner similar to the above. Only the heat resistant Pyrex (registered trademark) glass part of this adhesion specimen was cut into square forms having a side of 10 mm using a dicing apparatus. During cutting, the heat resistant Pyrex (registered trademark) glass did not come off and exhibited good processability. The adhesion specimens obtained by cutting only the heat resistant Pyrex (registered trademark) glass part were immersed in warm water having a temperature of 80° C. and delaminated. Further, ten delaminated cut test pieces were randomly taken out and the piece on the underside (surface provisionally fixed by the fixing agent) of each cut test piece was observed using an optical microscope, a maximum width (distance from a ridge in a surface direction parallel to the glass underside) of each glass chipped part was measured, and an average value and a standard deviation of the maximum widths were calculated.

TABLE-1

| Fixing agent | Fixing agent (I) | Fixing agent (II) | Fixing agent (III) |
|---|---|---|---|
| Adhesion strength (MPa) | 10.9 | 10.6 | 9.9 |
| Delamination time in warm water of 80° C. (min, sec) | 30 sec | 30 sec | 30 sec |
| Average value (μm) of maximum widths of chips of underside pieces of ten cut test pieces | 51.3 | 51.2 | 50.1 |
| Standard deviation (μm) of maximum widths of chips of underside pieces of ten cut test pieces | 5.8 | 5.6 | 5.1 |

Example 2

The fixing agent (III) was used as the fixing agent, and the stand-still process was used as the full fastening process. In the process (7), a stand-still temperature was set to 23° C. and a stand-still time was set to 4 hours. Except the above, the conditions were the same as in Example 1. When an obtained translucent rigid substrate laminate was immersed in warm water of 85° C. according to the process (11) for delamination, the fixing agent was softened in a film form and smoothly separated from each plate-shaped product.

Example 3

When the processes (1) to (6) were performed using the fixing agent (I) (or fixing agent (II)) under the following conditions in accordance with the present invention to manufacture a provisionally fastened translucent rigid substrate laminate, lamination precision could be examined and defects were easily repaired when the defects occurred. After the provisionally fastened translucent rigid substrate laminate was manufactured, the processes (7), (8) were further performed under the following conditions to manufacture a fully fastened translucent rigid substrate laminate, and subsequently, a processing of the processes (9), (10) was performed. When the obtained translucent rigid substrate laminate was delaminated according to the process (11), the fixing agent was softened in a film form and was smoothly separated from each plate-shaped product.

The following plate glasses were used as translucent rigid substrates. Each plate glass used was a glass plate having a width of 530 mm×a length of 420 mm×a thickness of 0.7 mm and attached with a plating pattern and given black printing patterns. Twenty four plate-shaped products of 120 mm×60 mm can be obtained from one plate glass. Further, the black printing patters are so attached to each plate-shaped product that the black printing patterns having a width of 2 mm are formed on outer peripheral portions on longer sides and the black printing patterns having a width of 18 mm are formed on outer peripheral portions on shorter sides. Further, a margin portion of the plate glass that does not constitute the plate-shaped products is an outer peripheral portion of 15 mm.

In the process (3), 40 g of the fixing agent (I) (or fixing agent (II)) was applied to each of both bonding surfaces of the plate glass.

In the process (5), bonding was performed by roll pressing at a line pressure of 0.5 kN/m. In the process (6), provisional fastening was performed by successively irradiating a beam having a spot diameter φ of 8 mm to four corners of the margin portion, which did not constitute the plate-shaped products, using a UV-LED irradiator. A UV irradiation amount was 500 mJ/cm$^2$ (measured by the cumulative illuminometer using the light receptor of 365 nm) and a UV irradiation time was 2 sec. In the process (7), full fastening was performed with an applied pressure set to 20 g/cm$^2$, a light irradiation amount, which was measured by the cumulative illuminometer using the light receptor of 365 nm, set to 2000 mJ/cm$^2$ and an irradiation time set to 20 sec. In the process (8), a plate glass laminate formed of twelve plate glasses was manufactured by using the fixing agent (I) (or fixing agent (II)) and repeating the above procedure. In the process (9), a disk cutter (diamond disk) was used and the laminate was divided into rectangular parallelepiped forms (width of 121 mm×length of 61 mm×thickness of 9.6 mm). In the process (10), grinding by a grindstone, perforation by an ultrasonic vibration drill, and edge face processing by a rotary brush were sequentially performed for shape processing. In the process (11), this plate glass laminate was immersed in warm water of 85° C. to be delaminated. After delamination, ten plate-shaped products were taken out and the piece on the underside (surface provisionally fixed by the fixing agent) of each plate-shaped product was observed using an optical microscope, maximum widths of glass chipped parts were measured, and an average value and a standard deviation of the maximum widths were calculated.

Example 4

When the processes (1) to (6) were performed using the fixing agent (III) under the following conditions in accordance with the present invention to manufacture a provisionally fastened translucent rigid substrate laminate, lamination precision could be examined and defects were easily repaired when the defects occurred. After the provisionally fastened translucent rigid substrate laminate was manufactured, the processes (7), (8) were further performed under the following conditions to manufacture a fully fastened translucent rigid substrate laminate, and subsequently, processing of the processes (9), (10) was performed. When the obtained translucent rigid substrate laminate was delaminated according to the process (11), the fixing agent was softened in a film form and was smoothly separated from each plate-shaped product.

The following plate glasses were used as translucent rigid substrates. Each plate glass used was a glass plate having a width of 530 mm×a length of 420 mm×a thickness of 0.7 mm and attached with a plating pattern and given black printing patterns. Twenty four plate-shaped products of 120 mm×60 mm can be obtained from one plate glass. Further, the black printing patters are so attached to each plate-shaped product that the black printing patterns having a width of 2 mm are formed on outer peripheral portions on longer sides and the black printing patterns having a width of 18 mm are formed on outer peripheral portions on shorter sides. Further, a margin portion of the plate glass that does not become the plate-shaped products is an outer peripheral portion of 15 mm.

In the process (3), 40 g of the fixing agent (III) was applied to each of both bonding surfaces of the plate glass.

In the process (5), bonding was performed by roll pressing at a line pressure of 0.5 kN/m. In the process (6), provisional fastening was performed by successively irradiating a beam having a spot diameter φ of 8 mm to four corners of the margin portion, which did not constitute the plate-shaped products, using a UV-LED irradiator. A UV irradiation amount was 500 mJ/cm$^2$ (measured by the cumulative illuminometer using the light receptor of 365 nm) and a UV irradiation time was 2 sec.

The processes (1) to (6) were repeated to manufacture a provisionally fastened translucent rigid substrate laminate. In the process (7), the obtained provisionally fastened translucent rigid substrate laminate was allowed to stand as the full fastening process. A stand-still temperature was set to 23° C. and a stand-still time was set to 4 hours. In the process (8), a plate glass laminate formed of twelve plate glasses was manufactured by using the fixing agent (III) and repeating the above procedure. In the process (9), a disk cutter (diamond disk) was used and the laminate was divided into rectangular parallelepiped forms (width of 121 mm×length of 61 mm×thickness of 9.6 mm). In the process (10), grinding by a grindstone, perforation by an ultrasonic vibration drill, and edge face processing by a rotary brush were sequentially performed for shape processing. In the process (11), this plate glass laminate was immersed in warm water of 85° C. to be delaminated. After delamination, ten plate-shaped products were taken out and the piece on the underside (surface provisionally fixed by the fixing agent) of each plate-shaped product was observed using an optical microscope, maximum widths of glass chipped parts were measured, and an average value and a standard deviation of the maximum widths were calculated.

Results of Examples 3 and 4 are shown in TABLE-2.

TABLE-2

| Fixing agent | Fixing agent (I) | Fixing agent (II) | Fixing agent (III) |
|---|---|---|---|
| Average value (μm) of maximum widths of chips of underside of ten plate shaped products | 74.7 | 67.3 | 23.1 |
| Standard deviation (μm) of maximum widths of chips of underside pieces of ten plate-shaped | 21.2 | 28.6 | 6.1 |

Although the embodiments of the present invention have been described with reference to the drawings, the present invention is not limited to these embodiments and various modifications and changes can be made thereto.

REFERENCE SIGNS LIST

10 Translucent rigid substrate bonding apparatus
11 Rack
12 Upper stage
13 Press unit
14 Suction unit
15 Suction hole
16 LED unit
17 Lower stage
18 Lower stage moving means
19 Side clamp
20 Lower substrate coating unit
21 Upper substrate coating unit
22 Imaging unit
23 Electric component unit
24 Lower substrate
25 Upper substrate
31 Translucent rigid substrate
32 Fixing agent
33 Rotary brush
41 Roll
42 Bonded substrates
51 Division line
52 Printing pattern

What is claimed is:

1. A method of manufacturing a translucent rigid substrate laminate, comprising:
   1) a process of preparing a first translucent rigid substrate;
   2) a process of preparing a second translucent rigid substrate;
   3) a process of applying a photo-curable fixing agent including (A) polyfunctional (meth)acrylate, (B) monofunctional (meth)acrylate and (C) a photopolymerization initiator to a first surface of the first translucent rigid substrate and/or a first surface of the second translucent rigid substrate;
   4) a process of allowing the first surface of the first translucent rigid substrate and the first surface of the second translucent rigid substrate to face each other so that the both surfaces are parallel to each other in a predetermined positional relationship in a surface direction;
   5) a process of applying a given pressure to the first surface of the first translucent rigid substrate and the first surface of the second translucent rigid substrate while maintaining the positional relationship to bond the both translucent rigid substrates;
   6) a process of irradiating light for curing only an outer peripheral portion of the fixing agent spreading between the both translucent rigid substrates to form a provisionally fastened translucent rigid substrate laminate;
   7) a full fastening process of curing the uncured fixing agent present in the provisionally fastened translucent rigid substrate laminate to form a fully fastened translucent rigid substrate laminate; and
   8) a process of repeating the processes 1) to 7) at least once by regarding the fully fastened translucent rigid substrate laminate as the first translucent rigid substrate to form a fully fastened translucent rigid substrate laminate in which at least three translucent rigid substrates are bonded, and
   wherein the full fastening process 7) is a stand-still process of allowing the uncured fixing agent present in the provisionally fastened translucent rigid substrate laminate to stand for curing to form the fully fastened translucent rigid substrate laminate.

2. A method of manufacturing a plate-shaped product, comprising:
   9) a process of dividing a translucent rigid substrate laminate obtained by using the method according to claim 1 in a thickness direction to form a desired number of divided translucent rigid substrate laminates;
   10) a process of performing desired shape processing on each of the divided translucent rigid substrate laminates; and
   11) a process of heating the divided translucent rigid substrate laminate after the shape processing to delaminate the bonded divided translucent rigid substrates from each other and form a plurality of plate-shaped products.

3. The method of manufacturing a plate-shaped product according to claim 2, further comprising:
   a process of bringing the divided translucent rigid substrate laminates into contact with a delaminating agent under temperature and time conditions required to reduce adhesion strength of an exposed portion of the outer edge of the fixing agent interposed between the divided translucent rigid substrates between the processes 9) and 10).

4. The method of manufacturing a translucent rigid substrate laminate according to claim 1, wherein the light is spot-irradiated to the outer peripheral portion of the fixing agent spreading between the both translucent rigid substrates only at two to six positions in the process 6) of forming the provisionally fastened translucent rigid substrate laminate.

5. The method of manufacturing a translucent rigid substrate laminate according to claim 1, wherein the process 6) of forming the provisionally fastened translucent rigid substrate laminate is a process of irradiating light for curing only the outer peripheral portion of the fixing agent spreading between the both translucent rigid substrates while maintaining the pressure to form the provisionally fastened translucent rigid substrate laminate.

6. A method of manufacturing a translucent rigid substrate laminate, comprising:
   1) a process of preparing a first translucent rigid substrate;
   2) a process of preparing a second translucent rigid substrate;
   3) a process of applying a photo-curable fixing agent including (A) polyfunctional (meth)acrylate, (B) monofunctional (meth)acrylate and (C) a photopolymerization initiator to a first surface of the first translucent rigid substrate and/or a first surface of the second translucent rigid substrate;
   4) a process of allowing the first surface of the first translucent rigid substrate and the first surface of the second translucent rigid substrate to face each other so that the both surfaces are parallel to each other in a predetermined positional relationship in a surface direction;
   5) a process of applying a given pressure to the first surface of the first translucent rigid substrate and the first surface of the second translucent rigid substrate while maintaining the positional relationship to bond the both translucent rigid substrates;
   6) a process of irradiating light for curing only an outer peripheral portion of the fixing agent spreading between the both translucent rigid substrates to form a provisionally fastened translucent rigid substrate laminate;
   7') a process of repeating the processes 1) to 6) at least once by regarding the provisionally fastened translucent rigid substrate laminate as the first translucent rigid substrate to form a provisionally fastened translucent rigid substrate laminate in which at least three translucent rigid substrates are bonded; and
   8') a full fastening process of curing the uncured fixing agent present in the provisionally fastened translucent rigid substrate laminate obtained in the process 7') to form a fully fastened translucent rigid substrate laminate, and
   wherein the full fastening process 8') is a stand-still process of allowing the uncured fixing agent present in the provisionally fastened translucent rigid substrate laminate obtained in the process 7') to stand for curing to form the fully fastened translucent rigid substrate laminate.

7. The method of manufacturing a translucent rigid substrate laminate according to claim 6, further comprising:
   8") a process of repeating the processes 1) to 6) at least once by regarding the fully fastened translucent rigid substrate laminate obtained in the process 8') as the first translucent rigid substrate to form a complex translucent rigid substrate laminate; and
   8"') a full fastening process of curing the uncured fixing agent present in the complex translucent rigid substrate laminate obtained in the process 8") to form a fully fastened translucent rigid substrate laminate having an increased lamination number.

8. The method of manufacturing a translucent rigid substrate laminate according to claim 7, wherein the full fastening process 8"') is an irradiation process of irradiating light for curing the uncured fixing agent present in the complex translucent rigid substrate laminate obtained in the process 8") to form the fully fastened translucent rigid substrate laminate having the increased lamination number.

9. The method of manufacturing a translucent rigid substrate laminate according to claim 7, wherein the full fastening process 8"') is a stand-still process of allowing the uncured fixing agent present in the complex translucent rigid substrate laminate obtained in the process 8") to stand to form the fully fastened translucent rigid substrate laminate having the increased lamination number.

10. The method of manufacturing a translucent rigid substrate laminate according to claim 6, wherein the light is spot-irradiated to the outer peripheral portion of the fixing agent spreading between the both translucent rigid substrates only at two to six positions in the process 6) of forming the provisionally fastened translucent rigid substrate laminate.

11. The method of manufacturing a translucent rigid substrate laminate according to claim 6, wherein the process 6) of forming the provisionally fastened translucent rigid substrate laminate is a process of irradiating light for curing only the outer peripheral portion of the fixing agent spreading between the both translucent rigid substrates while maintaining the pressure to form the provisionally fastened translucent rigid substrate laminate.

* * * * *